US012568237B2

(12) United States Patent 
Kalra et al.

(10) Patent No.: US 12,568,237 B2 
(45) Date of Patent: Mar. 3, 2026

(54) NEURAL NETWORK MASK GENERATION BASED ON TEMPORAL WINDOWS

(71) Applicant: Adobe Inc., San Jose, CA (US)

(72) Inventors: Nikhil Kalra, San Jose, CA (US); Seoung Wug Oh, San Jose, CA (US); Nico Alexander Becherer, Hamberg (DE); Joon-Young Lee, San Jose, CA (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 230 days.

(21) Appl. No.: 18/367,377

(22) Filed: Sep. 12, 2023

(65) Prior Publication Data

US 2025/0088650 A1 Mar. 13, 2025

(51) Int. Cl.
| | |
|---|---|
| *H04N 19/436* | (2014.01) |
| *G11B 27/031* | (2006.01) |
| *H04N 19/119* | (2014.01) |
| *H04N 19/136* | (2014.01) |
| *H04N 19/172* | (2014.01) |
| *H04N 19/85* | (2014.01) |

(52) U.S. Cl.
CPC ......... *H04N 19/436* (2014.11); *G11B 27/031* (2013.01); *H04N 19/119* (2014.11); *H04N 19/136* (2014.11); *H04N 19/172* (2014.11); *H04N 19/85* (2014.11)

(58) Field of Classification Search
CPC .. H04N 19/436; H04N 19/119; H04N 19/136; H04N 19/172; H04N 19/85
See application file for complete search history.

(56) References Cited

U.S. PATENT DOCUMENTS

2021/0150727 A1* 5/2021 Park ......................... G06N 3/04

OTHER PUBLICATIONS

Li et al., "VMFormer: End-to-End Video Matting with Transformer," arXiv:2208.12801v2 [cs.CV], 10 pages (Nov. 30, 2022).
Lin et al., "Robust High-Resolution Video Matting with Temporal Guidance," arXiv:2108.11515v1 [cs.CV], 14 pages (Aug. 25, 2021).

* cited by examiner

*Primary Examiner* — On S Mung
(74) *Attorney, Agent, or Firm* — FIG. 1 Patents

(57) ABSTRACT

In one aspect, a processor determines a first set of video frames of a video based on a target video frame. The first set of video frames includes the target video frame, one or more frames of the video preceding the target video frame, and one or more frames of the video subsequent to the target video frame. The first set of video frames includes a sequence of video frames of the video. An encoder neural network executing on the processor encodes the first set of video frames of a video to generate a respective feature vector for each video frame in the first set. A decoder neural network executing on the processor decodes the feature vectors to generate a mask for the target video frame.

20 Claims, 14 Drawing Sheets

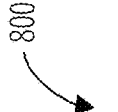
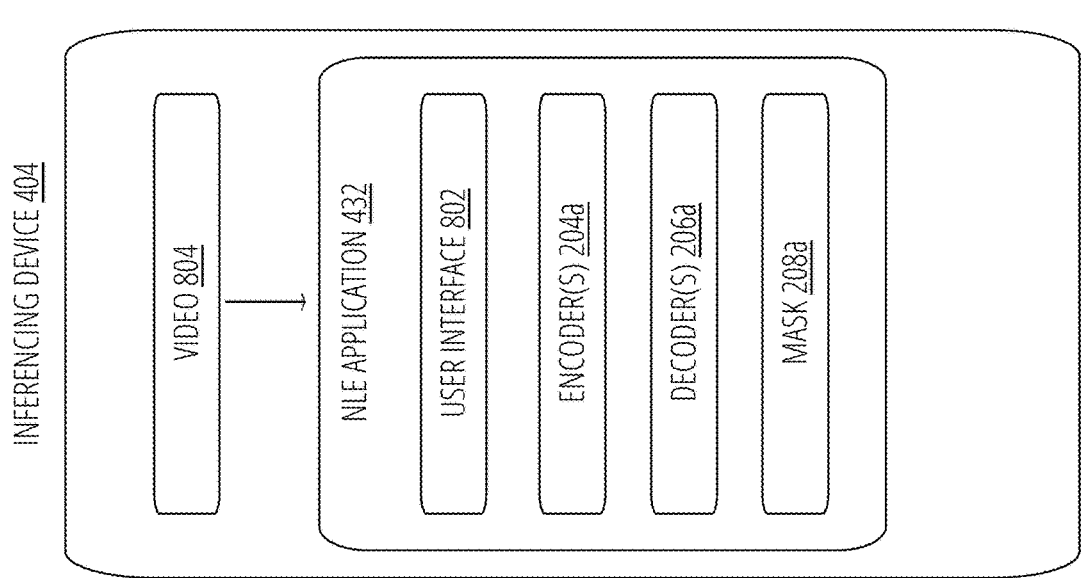
FIG. 8

900

RECEIVE, BY A NLE APPLICATION EXECUTING ON A PROCESSING DEVICE IMPLEMENTING THE PRESENT DISCLOSURE, SELECTION OF A TARGET VIDEO FRAME, THE TARGET VIDEO FRAME ONE OF A PLURALITY OF VIDEO FRAMES OF A VIDEO 902

DETERMINE, BY THE NLE APPLICATION, A FIRST SET OF VIDEO FRAMES OF A VIDEO BASED ON A TARGET VIDEO FRAME, WHEREIN THE FIRST SET INCLUDES THE TARGET VIDEO FRAME, ONE OR MORE FRAMES OF THE VIDEO PRECEDING THE TARGET VIDEO FRAME, AND ONE OR MORE FRAMES OF THE VIDEO SUBSEQUENT TO THE TARGET VIDEO FRAME, WHEREIN THE FIRST SET OF VIDEO FRAMES COMPRISES A SEQUENCE OF VIDEO FRAMES OF THE VIDEO 904

PROCESS, BY AN ENCODER NEURAL NETWORK OF THE NLE APPLICATION, THE VIDEO FRAMES IN THE FIRST SET TO PRODUCE A RESPECTIVE FEATURE VECTOR FOR EACH VIDEO FRAME IN THE CONTEXT WINDOW 906

DECODE, BY A DECODER NEURAL NETWORK OF THE NLE APPLICATION, THE FEATURE VECTORS TO GENERATE A MASK FOR THE TARGET VIDEO FRAME 908

FIG. 9

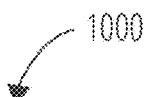

RECEIVING, BY A PROCESSING DEVICE IMPLEMENTING THE PRESENT DISCLOSURE, TRAINING DATA COMPRISING A PLURALITY OF FRAMES <u>1002</u>

GENERATING, BY THE PROCESSING DEVICE, A PLURALITY OF WINDOWS COMPRISING SUBSETS OF THE FRAMES <u>1004</u>

ENCODING, BY AN ENCODER NEURAL NETWORK EXECUTING ON THE PROCESSING DEVICE, THE PLURALITY OF WINDOWS TO GENERATE A FEATURE VECTOR FOR EACH FRAME IN EACH WINDOW <u>1006</u>

DECODING, BY AN DECODER NEURAL NETWORK EXECUTING ON THE PROCESSING DEVICE, THE FEATURE VECTORS FOR EACH WINDOW TO GENERATE A RESPECTIVE MASK FOR A TARGET FRAME IN EACH WINDOW <u>1008</u>

COMPARING, BY THE PROCESSING DEVICE, THE MASKS GENERATED BY THE DECODER TO LABELS ASSOCIATED WITH THE TRAINING DATA <u>1010</u>

UPDATING THE ENCODER NEURAL NETWORK AND THE DECODER NEURAL NETWORK BASED ON THE COMPARISON <u>1012</u>

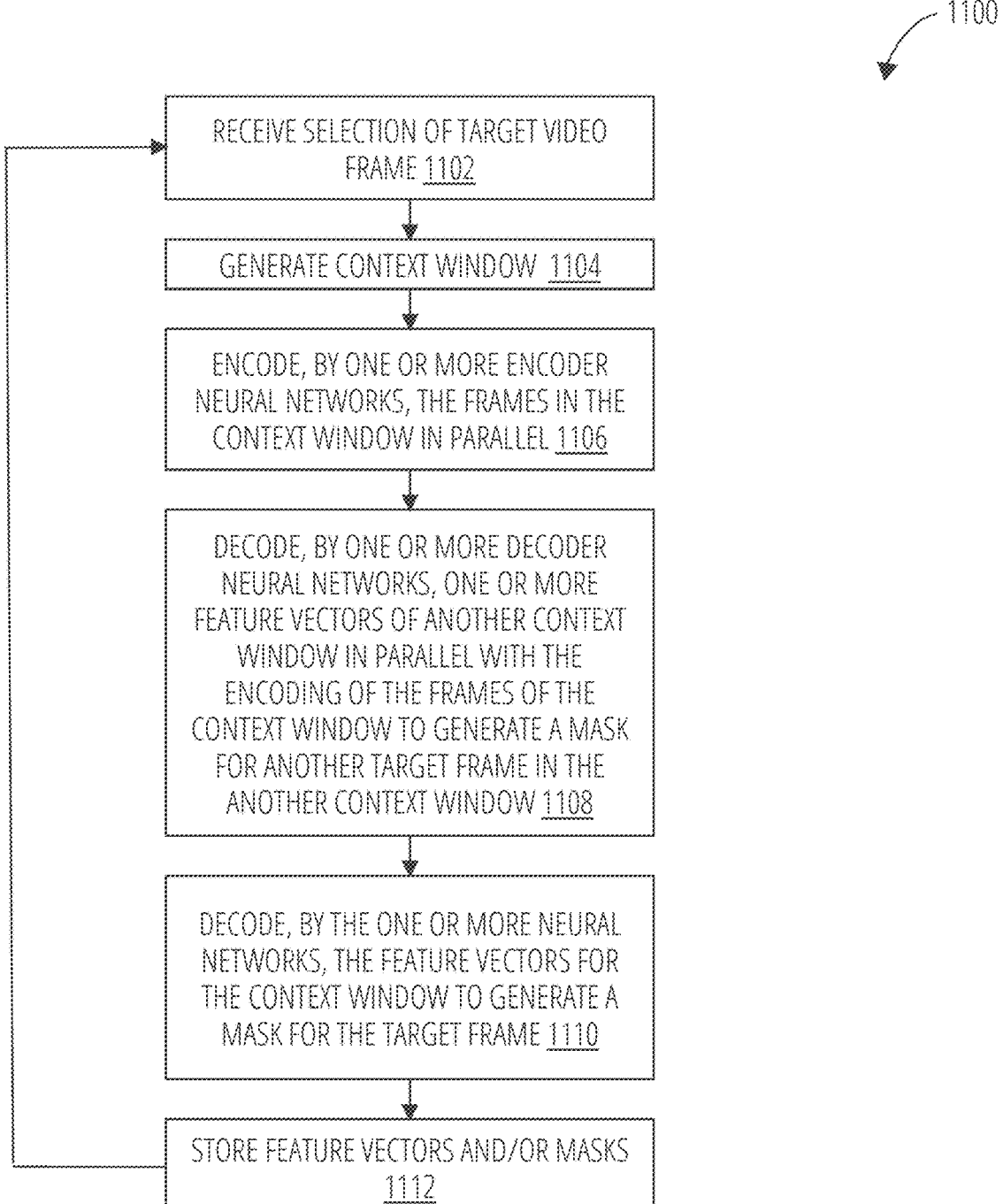

RECEIVE SELECTION OF TARGET VIDEO FRAME 1102

GENERATE CONTEXT WINDOW 1104

ENCODE, BY ONE OR MORE ENCODER NEURAL NETWORKS, THE FRAMES IN THE CONTEXT WINDOW IN PARALLEL 1106

DECODE, BY ONE OR MORE DECODER NEURAL NETWORKS, ONE OR MORE FEATURE VECTORS OF ANOTHER CONTEXT WINDOW IN PARALLEL WITH THE ENCODING OF THE FRAMES OF THE CONTEXT WINDOW TO GENERATE A MASK FOR ANOTHER TARGET FRAME IN THE ANOTHER CONTEXT WINDOW 1108

DECODE, BY THE ONE OR MORE NEURAL NETWORKS, THE FEATURE VECTORS FOR THE CONTEXT WINDOW TO GENERATE A MASK FOR THE TARGET FRAME 1110

STORE FEATURE VECTORS AND/OR MASKS 1112

COMPUTER-READABLE STORAGE MEDIUM 1202

COMPUTER EXECUTABLE INSTRUCTIONS 1204

COMPUTER EXECUTABLE INSTRUCTIONS FOR NLE APPLICATION 1206

COMPUTER EXECUTABLE INSTRUCTIONS FOR ENCODER 1208

COMPUTER EXECUTABLE INSTRUCTIONS FOR DECODER 1210

NEURAL NETWORK MASK GENERATION BASED ON TEMPORAL WINDOWS

BACKGROUND

Non-linear video editing programs allow different portions of a video to be edited. However, video frames are temporally related, which causes machine learning (ML) model-based applications to suffer from poor temporal consistency. Conventional solutions to this problem include feed-forward neural network models. However, these solutions introduce severe bottlenecks, as inference operations must be run sequentially. Doing so fails to take advantage of parallel processing capabilities of hardware (e.g., processors, graphics processors, etc.), resulting in slow processing times and a poor user experience.

Furthermore, the use of feed-forward models precludes the ability to support random frame access, as these solutions require the entire video to be processed before a selected frame can be accessed. Therefore, for example, if a user specifies to edit a frame that is 2.5 hours into a 3 hour video, conventional feed-forward solutions require processing the first 2.5 hours of the video before the user can edit the specified frame.

SUMMARY

Embodiments are generally directed to improving performance in a non-linear editing (NLE) system by allowing a user to select any frame of a video for editing without requiring the system to process the entire video. Embodiments disclosed herein separate an encoder and decoder of the NLE system into two separate neural networks. The user selects a frame for editing in the NLE system. The NLE system defines a context window of N context frames (e.g., 3 frames preceding the selected frame and 3 frames subsequent to the selected frame). The encoder encodes each frame in the context window to create a feature vector for each frame. The decoder processes the feature vector embeddings to generate a mask for the selected video frame. The feature vector embeddings are stored for later use. In some embodiments, different features are processed by the decoder for different frames in the context window.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 illustrates an operating environment 800 in accordance with one embodiment.

FIG. 9 illustrates a logic flow 900 in accordance with one embodiment.

FIG. 10 illustrates a logic flow 1000 in accordance with one embodiment.

FIG. 11 illustrates an aspect of the subject matter in accordance with one embodiment.

DETAILED DESCRIPTION

Figure 1:
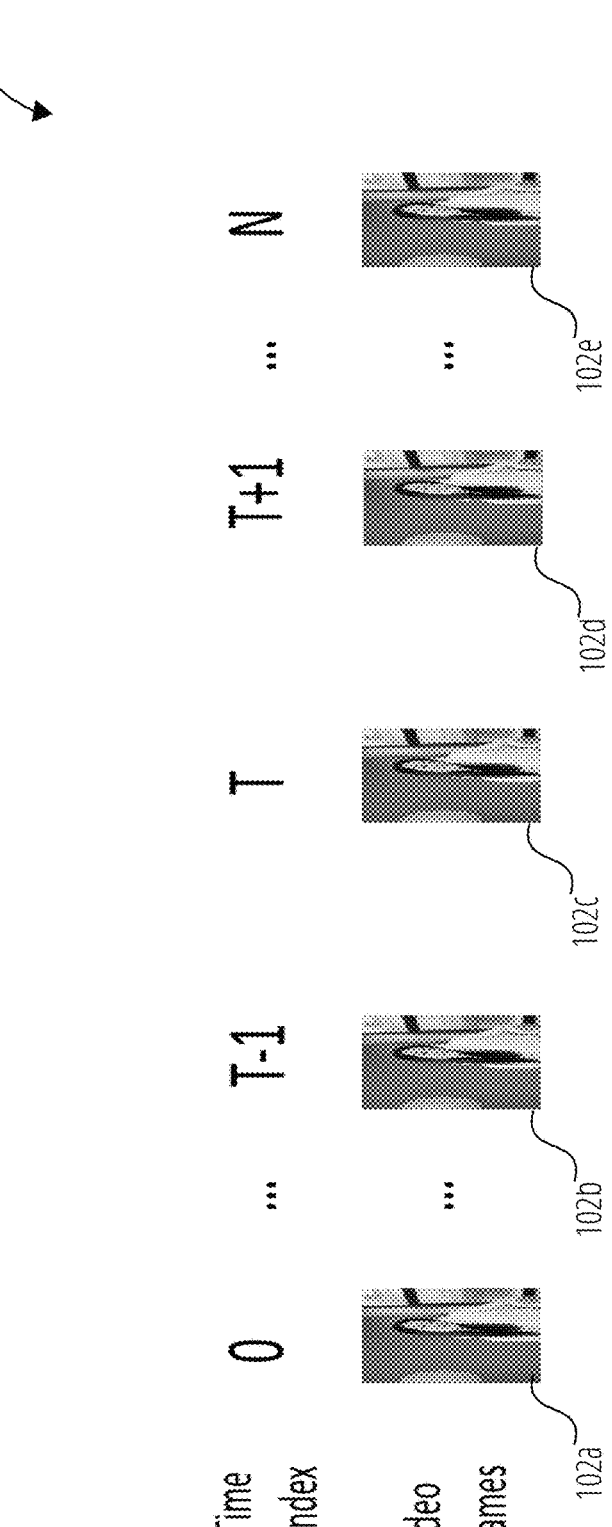
FIG. 1 illustrates an aspect of the subject matter in accordance with one embodiment.

Embodiments disclosed herein provide a performant and parallelizable solution that allows random frame access in a video stream with a high degree of temporal coherence. More generally, embodiments disclosed herein provide a non-linear editing (NLE) system that allows a user to select any frame of a video for editing without requiring the system to process the entire video or large portions thereof (e.g., from the start of the video to the selected frame) for mask generation. Therefore, embodiments disclosed herein provide a time-independent video masking model architecture that supports random access mask generation and high throughput processing, e.g., by using batch execution supported by graphics processing units (GPUs) or multiple processor cores of a processor.

Embodiments disclosed herein separate an encoder and decoder into two separate neural networks. The NLE system determines a window of N context frames including a frame selected by the user (e.g., 3 frames preceding the selected frame and 3 frames subsequent to the selected frame). The encoder neural network encodes each context frame in the window to create a feature vector for each context frame. The decoder neural network processes the feature vectors generated by the encoder to generate a mask for the selected video frame. The feature vectors are stored for later use. In some embodiments, different features are processed by the decoder for different frames in the context window.

By processing only the window of context frames, the present disclosure improves system performance relative to conventional solutions which require the entire video to be processed. Asynchronous, batch-based processing supported by the disclosure through the use of time-independent feature extraction and mask generation allows an application to leverage all available computing resources. Doing so saves time as all available computing resources can be leveraged simultaneously. Furthermore, doing so allows users to access and/or edit desired frame more quickly, e.g., the application loads frames faster and is generally more responsive (as the application is not requiring time and/or computing resources to perform background processing). The separation of the encoder and decoder allows each to execute independently. The disclosure eliminates redundant processing by encoding each video frame once, rather than each time the frame appears in a context window. By using the context window, the disclosure eliminates the need to include the hidden state/recurrent layers of the neural networks. Furthermore, by using the context window, the disclosure considers subsequent frames, which is not possible in recurrent neural network architectures. Although exemplary embodiments are described in connection with a particular artificial intelligence (AI) or ML system, the principles described herein can also be applied to other types of machine learning systems as well. Embodiments are not limited in this context.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 121 illustrated as components 121-1 through 121-*a* may include components 121-1, 121-2, 121-3, 121-4, and 121-5. The embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

FIG. 1 illustrates a schematic 100. The schematic 100 depicts a plurality of video frames of a video, including frames 102*a*-102*e*. The video optionally includes other frames that are not depicted for the sake of clarity. As shown, each video frame is associated with a time index, namely time indices 0 through N, where N is any positive integer. Although video frames are used as a reference example herein, the disclosure is equally applicable to other types of sequential data that occurs across a time series, e.g., audio clips, natural language, animations, simulations (e.g., materials, object, radio waves, etc.), and the like.

Often, users edit videos using non-linear editing (NLE) systems. These systems allow users to edit videos without regard to the linear timeline, e.g., by selecting any desired frame for editing. For example, a user of the NLE system can edit frame 102*c*, then edit frame 102*a*, and edit frame 102*d*. Embodiments are not limited in this context. In contrast, other editing systems require the user to edit the video linearly, e.g., beginning at frame 102*a*.

Furthermore, some NLE systems that implement machine learning (e.g., feed-forward models such as a recurrent neural network (RNN)) require all frames of a video to be processed (e.g., decoded and/or rendered) prior to allowing a user to edit a selected frame of a video. For example, in RNN implementations, the RNN includes one or more recurrent layers to maintain a hidden state that is built on all frames in the video that have been sequentially processed. Therefore, in these implementations, if the user specifies to edit a frame that occurs 1 hour into a 1 hour and 1 minute video, the user must wait for the first 1 hour and 1 minute of the video to be processed before being able to edit the specified frame. Doing so wastes computing resources, time, and eliminates the ability to leverage parallel processing capabilities of processors (CPUs) and/or GPUs. For example, feed-forward solutions introduce severe bottlenecks in the ML pipeline, as feed-forward inference operations must run sequentially (because feed-forward implementations can only consider prior frames, as the hidden state is built from the results of processing prior frames sequentially). As such, significant system resources may be unused for such operations. Advantageously, embodiments disclosed herein utilize more system resources, i.e., by allowing one or more encoder neural network instances to execute in parallel with one or more decoder neural network instances to produce and assemble the output faster and more efficiently than these conventional solutions. Furthermore, by approximating the hidden state using a window of context frames, embodiments disclosed herein obviate the need to determine the hidden state sequentially by processing all video frames.

Figure 2:
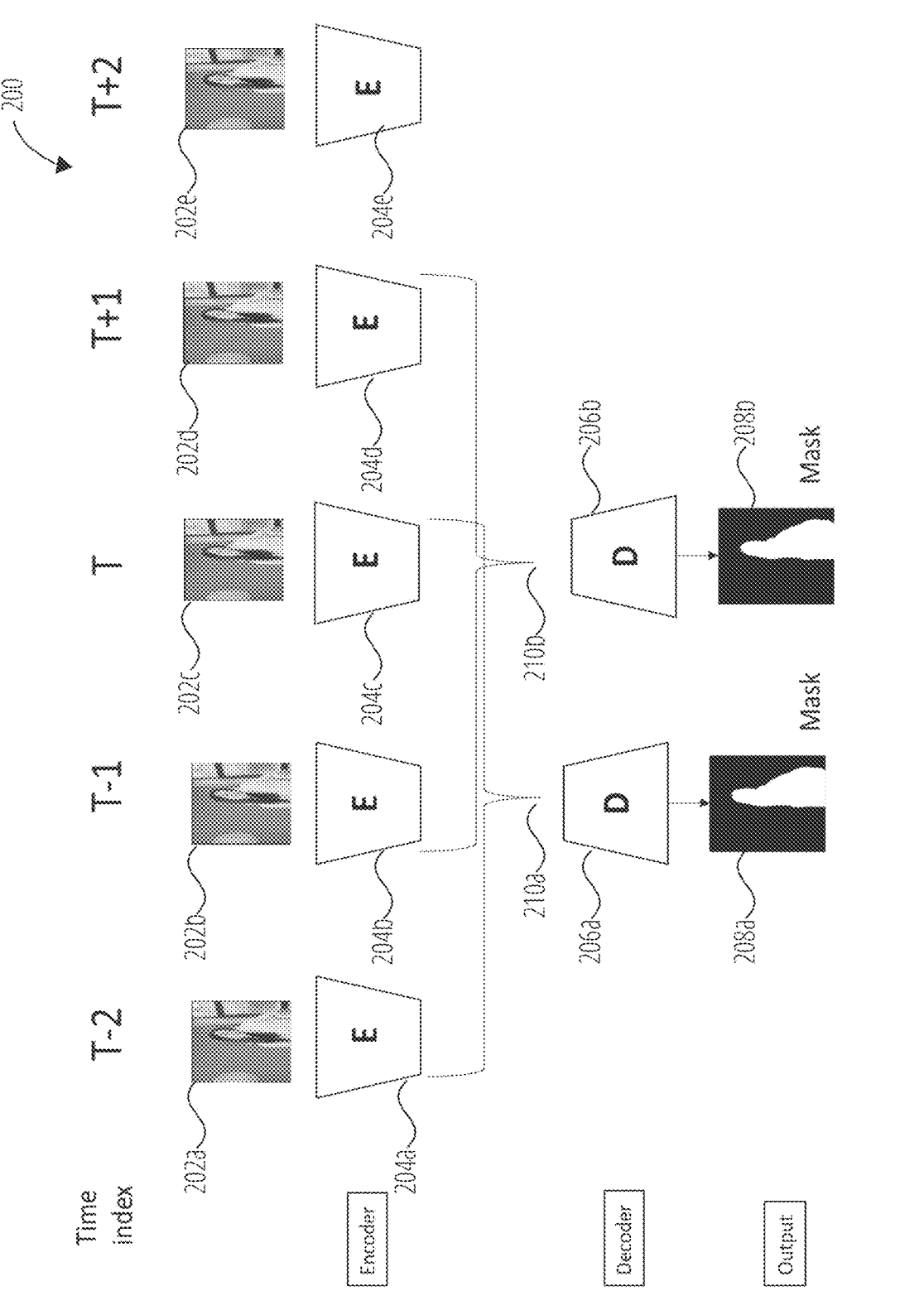
FIG. 2 illustrates an aspect of the subject matter in accordance with one embodiment.

FIG. 2 illustrates an embodiment of a system 200. The system 200 is suitable for implementing one or more embodiments as described herein. In one embodiment, for example, the system 200 is an AI/ML NLE system suitable for using temporal context windows to process video frames. One example of an AI/ML NLE system is Adobe® Premiere Pro.

As shown, the NLE system 200 includes one or more encoder neural networks 204*a*-204*c* and one or more decoder neural networks 206*a*-206*b*. The encoders 204*a*-204*c* may generally process a video frame, such as video frames 202*a*-202*e* and generate a respective feature vector (or embedding) for the corresponding video frame. The decoders 206*a*-206*b* process the output of the encoders 204*a*-204*c* (e.g., the feature vectors) to generate an output, which may include segmentation masks such as masks 208*a*. 208*b*, or any other type of output. More generally, the disclosure is applicable to any task that predicts an output for input that is indexed based on time intervals. Furthermore, the encoders 204*a*-204*e* and/or decoders 206*a*-206*b* are representative of a series of machine learning operators. Therefore, in some embodiments, the encoders 204*a*-204*e* and/or decoders 206*a*-206*b* are distinct from components used to encode and/or decode raw video frames into compressed formats.

The encoders 204*a*-204*e* and decoders 206*a*-206*b* are representative of any type of neural network. Although depicted as separate encoders, the encoders 204*a*-204*e* are representative of one or more encoder neural networks. Similarly, although depicted as separate decoders, the decoders 206*a*-206*b* are representative of one or more decoder neural networks. In at least one embodiment, the encoders 204*a*-204*e* and decoders 206*a*-206*b* do not include recurrent layers. In some embodiments, the encoders 204*a*-204*e* and decoders 206*a*-206*b* are implemented as convolutional neural networks (CNNs). The CNNs stack convolution, normalization, and non-linearity layers. In some embodiments, the encoders 204*a*-204*e* and decoders 206*a*-206*b* are implemented as transformers. Therefore, the disclosure is not limited to any particular type of network.

As shown, the encoders 204*a*-204*e* operate on one or more context windows 210*a*, 210*b*, where a window includes a subset of the frames of a video. A given window 210*a*, window 210*b* may include N frames of a video, where N is a positive integer. In some embodiments, the size of the windows 210*a*-210*b* are based on the number of frames that saturate the perceptive region of recurrent units of recurrent neural networks, or any other units that simulate the functionality provided by the recurrent units of a video masking network, such as temporal convolution networks. For example, as shown, window 210a includes the output of encoders 204a-204c, which process frames 202a-202c of a video. Similarly, window 210b includes the output of encoders 204b-204d, which process frames 202b-202d of the video. Therefore, in the example depicted in FIG. 2, the windows 210a, 210b include a sequence of three video frames. Each frame 202a-202e includes an associated timestamp to reflect the temporal sequence of frames in a given video.

Moreover, window 210a is generated based on a user specifying to edit video frame 202b in an NLE system. Therefore, in such an example, video frame 202b is the "target" video frame and the window 210a includes at least one frame preceding the target frame (e.g., frame 202a) and at least one frame subsequent to the target frame (e.g., frame 202c). Similarly, window 210b is generated based on a user specifying to edit video frame 202c in an NLE system. Therefore, in such an example, video frame 202c is the "target" video frame and the window 210b includes at least one frame preceding the target frame (e.g., frame 202b) and at least one frame subsequent to the target frame (e.g., frame 202d).

For example, as stated, the user may specify to edit frame 202b in the NLE system 200. The NLE system may then generate the window 210a to include at least frames frame 202a-202c. The encoders 204a-204c may encode frames frame 202a-202c to produce feature vectors for frames 202a-202c. Therefore, system 200 supports parallel encoding of video frames, e.g., through the use of a batch processing feature of a GPU (not pictured) and/or via multiple cores of a CPU. For example, multiple instances of the encoders 204a-204e and/or the decoders 206a-206b can execute in parallel, i.e., on multiple cores of a processor or multiple cores of the GPU. However, in some embodiments, a single encoder (e.g., one of encoders 204a-204c) sequentially encodes each frame 202a-202c. The feature vectors may be stored for later use (e.g., in memory). Furthermore, in some embodiments, encoders 204a-204e process frames while decoder 206a processes feature vectors of other frames in parallel, e.g., through the use of a batch processing feature using the cores of the GPU and/or via the cores of the CPU.

In some embodiments, the encoders 204a-204e compute pixel-wise segmentation masks for a given frame 202a-202e. In some embodiments, encoders 204a-204e classify one or more objects in each frame 202a-202e. In some embodiments, one or more layers of the encoders 204a-204e apply one or more filters to generate one or more features based on one or more pixels of a given frame 202a-202e. In some embodiments, each layer of the encoders 204a-204e determines one or more features that are based on features of other frames 202a-202e in the window. For example, one layer of the encoders 204a-204e extracts features such as horizontal or diagonal edges in a frame 202a-202e. This output is passed to the next layer of the encoders 204a-204e which detect more complex features such as corners or combinational edges. Additional layers of the encoders 204a-204e identify more complex features such as objects, faces, etc.

The decoder 206a may then process the feature vectors generated by the encoders to produce an output, e.g., mask 208a. For example, the mask 208a may be a segmentation mask that is associated with an object depicted in the frame 202b. A mask is an image (e.g., a binary image) that represents the different regions or objects in the target frame.

In some embodiments, the decoders 206a-206b use their trained weights to create a probability map for each pixel in the frames 202a-202e. Each pixel in the probability map represents the probability that the pixel belongs to a particular object class. The decoders 206a-206b then use a threshold to binarize the probability map, producing a mask such as mask 208a or 208b that indicates which pixels belong to each object class. More generally, pixels of a mask are assigned a value of either 0 or 1 based on the threshold value, e.g., to indicate whether or not the pixel belongs to a particular class or category (e.g., a pixel is associated with a person, a cat, etc.).

In the example depicted in FIG. 2, the mask 208a is associated with a person depicted in frames 202a-202c. Therefore, the black pixels in mask 208a indicates which pixels are not associated with the person depicted in frames 202b. Similarly, the white pixels in mask 208a indicate which pixels are associated with the person depicted in frames 202b. The user may then use the mask 208a for editing purposes, e.g., to modify a color of the object in video frame 202b, move the object within video frame 202b, remove the object from the video frame 202b, or modify an attribute of the object in frame 202b. The mask 208a and the results of the editing may be stored in memory or any suitable non-transitory medium.

Because the window 210a includes frames 202a and 202c, the NLE system 200 generates the mask 208a for frame 202b based on information of frames that are prior to and subsequent to frame 202b. In contrast, RNN-based solutions do not consider frames that are subsequent to the frame being edited. Furthermore, in some embodiments, the video associated with frames 202a-202e includes one or more frames preceding frame 202a and one or more frames subsequent to frame 202e that are not depicted for the sake of clarity. Therefore, the mask 208a is generated without the encoders 204a-204c and decoders 206a-206b processing all frames of the video. Further still, because the encoders 204a-204e are separated from the decoders 206a-206b, each can be invoked independently. For example, as stated, encoders 204a-204c may encode frames in parallel while decoders 206a-206b decode feature vectors in parallel.

The user then selects frame 202c for editing. The NLE system 200 then defines window 210b based on the selection of frame 202c for editing. The window 210b includes frames 202b-202d. The encoder 204d processes frame 202d to generate a feature vector for frame 202d. Because the feature vectors for frames 202b-202c were stored when generating the mask 208a, the encoders 204a-204e need not re-process frames 202b-202c. The decoder 206b then processes the feature vectors for frames 202b-202d to generate the mask 208b for frame 202c, where the previously stored feature vectors for frames 202b and 202c are retrieved for processing. The user may then use mask 208b to edit frame 202c. The mask 208b and the results of the editing may be stored in memory or any suitable non-transitory medium.

In some embodiments, the decoders 206a-206b are more "lightweight" than the encoders 204a-204c, e.g., the decoders 206a-206b require less computing resources and/or processing time than the encoders 204a-204c. Therefore, by separating the encoders 204a-204c and decoders 206a-206b, each can be invoked separately. Furthermore, the separation allows the reuse of feature vectors generated by the encoders 204a-204e, e.g., when a frame appears in multiple context windows. Doing so reduces redundant processing of video frames by the encoders 204a-204c, which consume more resources and require more processing time than the decoders 206a-206b. Since the decoders 206a-206b are lightweight, having the decoders 206a-206b re-process certain feature vectors within different context windows does not significantly impact system performance. Furthermore, because the encoders 204a-204e and decoders 206a-206b can execute concurrently (e.g., in parallel), the overall system performance is improved. Further still, any combination of encoders 204a-204e and decoders 206a-206b can be created, such that a given combination of the resultant network uses a predetermined number of frames in context windows 210a-210b, where the encoders internally produce the feature vector states for all frames in the context window before passing the feature vectors to the decoders.

In some embodiments, the encoders 204a-204e and the decoders 206a-206b are integrated into a single neural network architecture. In such embodiments, a unified neural network model includes one or more encoders such as encoders 204a-204e and one or more decoders such as decoders 206a-206b. In such embodiments, the encoder processes context frames (e.g., of a context window such as context windows 210a-210b) to produce feature vectors and the feature vectors are passed to the decoder for decoding.

To train the encoders 204a-204e and decoders 206a-206b, the encoders 204a-204e and decoders 206a-206b are initialized with predetermined weights. The encoders 204a-204e and decoders 206a-206b are then trained on a dataset of images that have been manually segmented (e.g., have ground truth masks). For each image in the dataset, the encoders 204a-204e generate embeddings and the decoders 206a-206b predict a mask. The predictions are compared to the ground truth masks. The weights of the encoders 204a-204e and the decoders 206a-206b are updated based on the difference between its predictions and the ground truth masks. These steps are repeated until the encoders 204a-204e and decoders 206a-206b converge.

As stated, the encoders 204a-204e replace the usage of an RNN or other network with recurrent units by using a context window to generate an equivalent of the hidden state otherwise stored or accumulated by the RNN. For example, the hidden state of an RNN may be represented by the following equation:

$$\text{HiddenState\_A}\,(t) = GeneratedStateFromInternalNeurons\,(t) +$$
$$Decay\_Constant * \text{HiddenState\_A}\,(t-1).$$

This, equation may be rewritten as:

$$\text{H\_A}\,(t) = G\,(t) + D * \{G\,(t-1) + D * \{G\,(t-2) + D * \{G\,(t-3) + \dots \}\}\}$$

In either case of D being a trained parameter or a hyperparameter, there exists a value q, where the accumulated state prior to (t−q) is negligibly factored into the state at value t. In other words, the limit at time t for H (t−q−1)=0.

The (t−q) value (referred to as "c" herein) becomes the size of the context window, and the encoders 204a-204e are used to generate the feature vectors for G(0 . . . c). The decoders 206a-206b then use the feature vectors to approximate an equivalent of the hidden state for a frame at time t:

$$\text{H\_B}\,(t) = D^{\wedge}\,(c) * G\,(0) + D^{\wedge}\,(c-1) * G\,(1) + \dots$$

Embodiments are not limited in these contexts.

Figure 3:
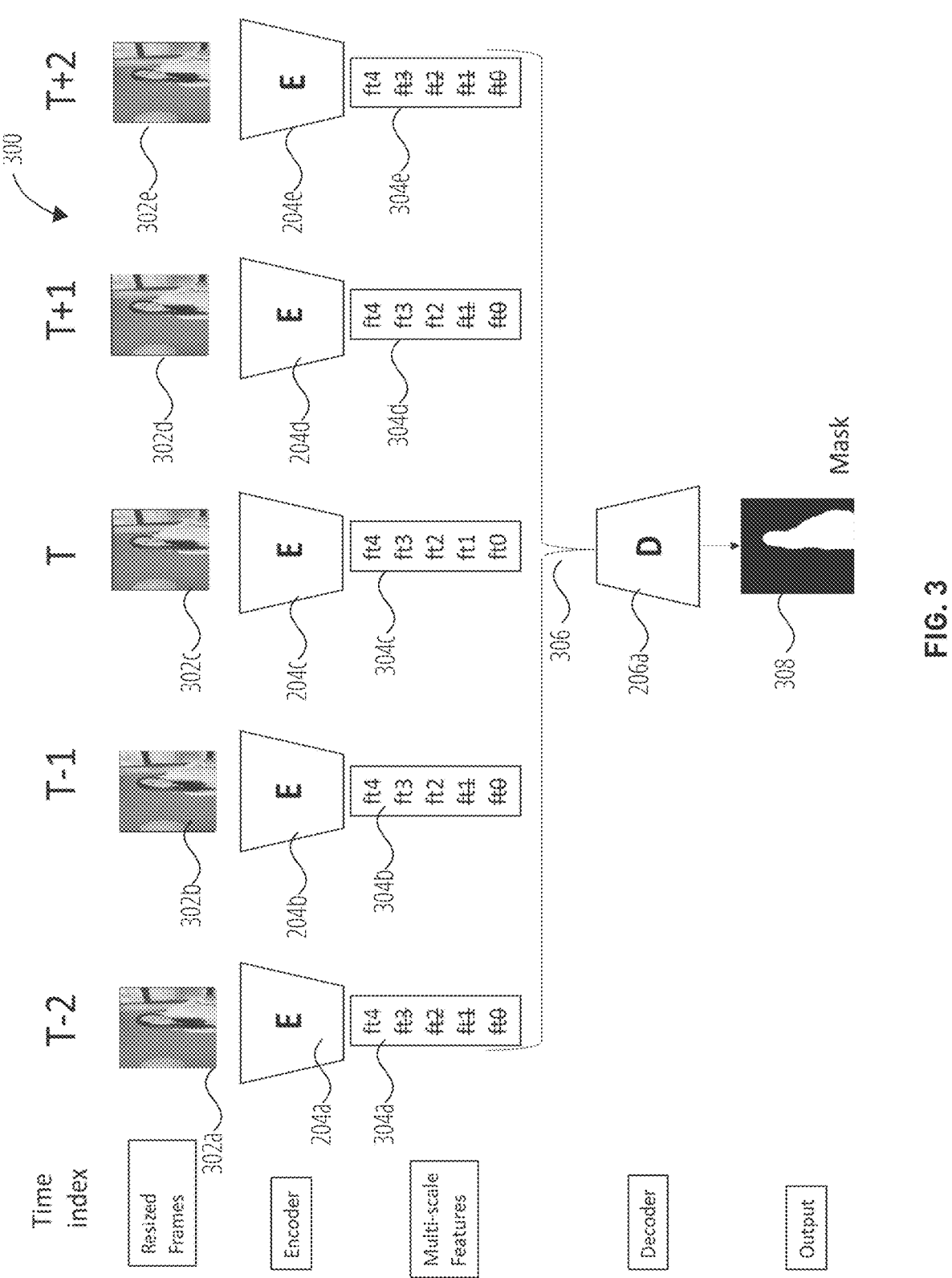
FIG. 3 illustrates an aspect of the subject matter in accordance with one embodiment.

FIG. 3 illustrates an embodiment of a system 300. The system 300 is suitable for implementing one or more embodiments as described herein. In one embodiment, for example, the system 300 is an AI/ML NLE system suitable for using temporal windows to process video frames.

In the embodiment depicted in FIG. 3, a user of an NLE system selects video frame 302c for editing. As shown, video frame 302c is one of a plurality of video frames 302a-302e of a video. The video includes other frames that are not depicted for the sake of clarity, e.g., one or more frames preceding frame 302a and/or one or more frames subsequent to video frame 302e. In some embodiments, the NLE system may pre-process the video frames, e.g., by converting the frames to a specified resolution (e.g., 320× 320 pixels, etc.), converting a colorspace of the frames according to a desired colorspace, etc.

To create a mask 308 for the selected frame 302c, NLE system 300 defines a window 306 including frames 302a-302e. Therefore, in the example depicted in FIG. 3, the size of window 306 includes five frames. As shown, encoders 204a-204e process frames 302a-302e to output a feature vector 304a-304e, respectively. The encoders 204a-204e may process the frames 302a-302e in parallel, e.g., through the use of a batch processing feature of a GPU (not pictured) and/or via multiple cores of a CPU. However, as stated, in some embodiments, one or more of the encoders 204a-204e may process the frames linearly. Furthermore, in some embodiments, encoders 204a-204e process frames while decoder 206a processes feature vectors of other frames in parallel, e.g., through the use of a batch processing feature of the GPU and/or via the cores of the CPU.

As shown, feature vectors 304a-304e include a plurality of features, including example features ft0-ft4. A feature includes, for example, a value, equation, or data structure that represents an attribute. In some embodiments, features include (or include representations of) edges, shapes, colors, gradients, transformations, filters, semantic content (e.g., subject matter of the frame, what type of object is depicted in the frame, where an object is depicted in a frame, whether a particular object is depicted the frame, how many objects are depicted in the frame, etc.). In some cases, features include data that is not intended for human interpretation, such as a data structure or a mathematical description of an attribute. More generally, a feature is associated with one or more attributes, of the frames 302a-302e. In some embodiments, the features of the feature vectors 304a-304e are learned during training of the encoders 204a-204c and/or the decoders 206a-206b.

More generally, one or more layers of the encoders 204a-204e process the frames 202a-202e. Each layer of the encoders 204a-204e extracts one or more features from the frames 202a-202e, such as edges, shapes, and textures. Therefore, the encoders 204a-204e reduce the spatial resolution of the frames 202a-202c.

The decoder 206a then decodes the feature vectors 304a-304e to generate a mask 308. The decoder 206a therefore upsamples the features in feature vectors 304a-304e and recovers the spatial resolution of the frame 302c such that the features can be mapped back to a segmentation mask with the same dimensions as the frame 302c. In some embodiments, all features of the feature vectors 304a-304e are processed by the decoder. However, in the embodiment depicted in FIG. 3, the decoder 206a processes different subsets of the features in feature vectors 304a-304c. For example, features that are struck through in FIG. 3 are not processed by the decoder 206a. Therefore, as shown, all features of feature vector 304c are processed by decoder 206a. Similarly, features ft2-ft4 of feature vectors 304b, 304d are processed by decoder 206a. Further still, feature ft4 of feature vectors 304a, 304e are processed by decoder 206a.

Figure 4:
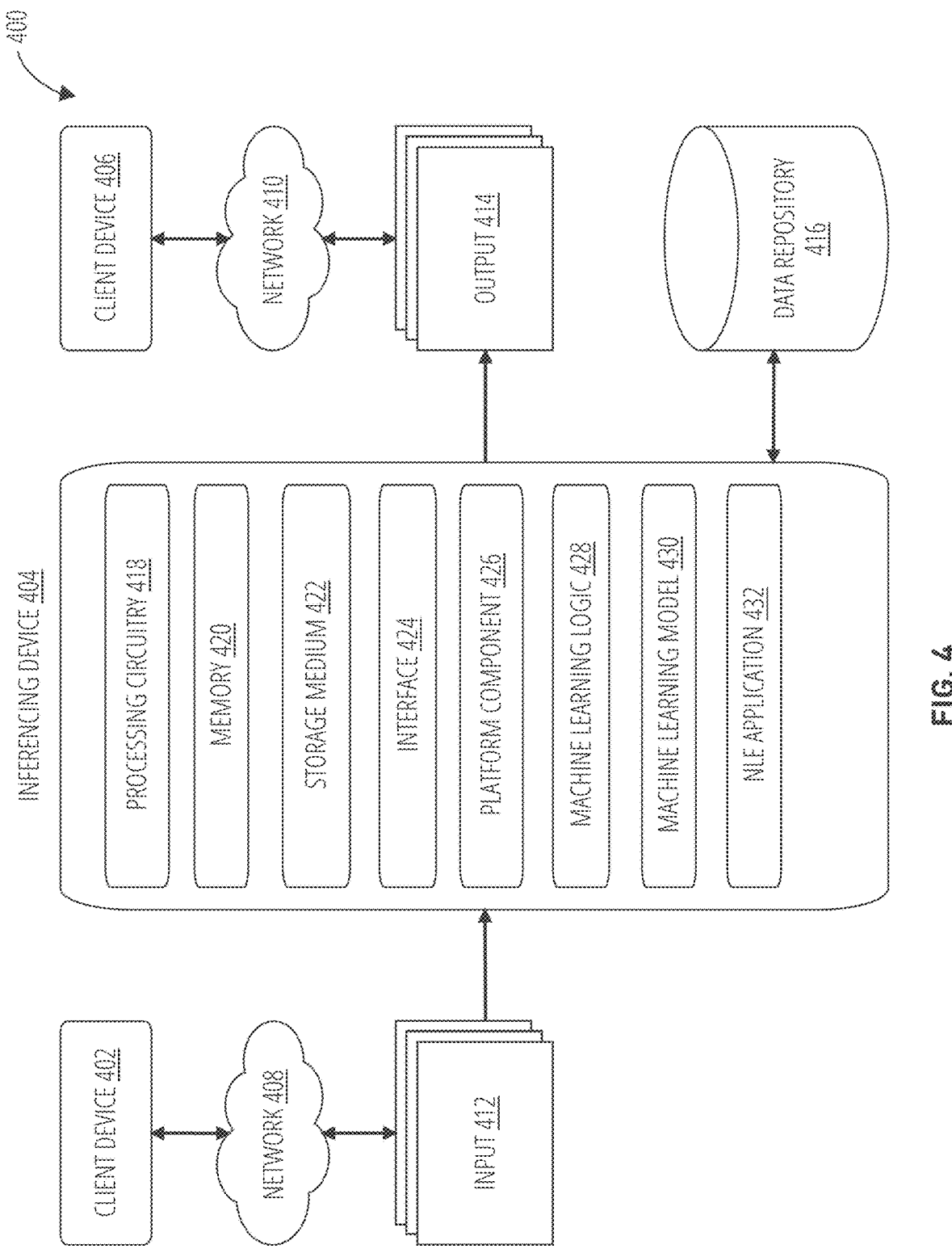
FIG. 4 illustrates a system 400 in accordance with one embodiment.

FIG. 4 illustrates an embodiment of a system 400. The system 400 is suitable for implementing one or more embodiments as described herein. In one embodiment, for example, the system 400 is an AI/ML system suitable for using temporal windows to process video frames.

The system 400 comprises a set of M devices, where M is any positive integer. FIG. 4 depicts three devices (M=3), including a client device 402, an inferencing device 404, and a client device 406. The inferencing device 404 communicates information with the client device 402 and the client device 406 over a network 408 and a network 410, respectively. The information includes input 412 from the client device 402 and output 414 to the client device 406, or vice-versa. In one alternative, the input 412 and the output 414 are communicated between the same client device 402 or client device 406. In another alternative, the input 412 and the output 414 are stored in a data repository 416. In yet another alternative, the input 412 and the output 414 are communicated via a platform component 426 of the inferencing device 404, such as an input/output (I/O) device (e.g., a touchscreen, a microphone, a speaker, etc.).

Figure 13:
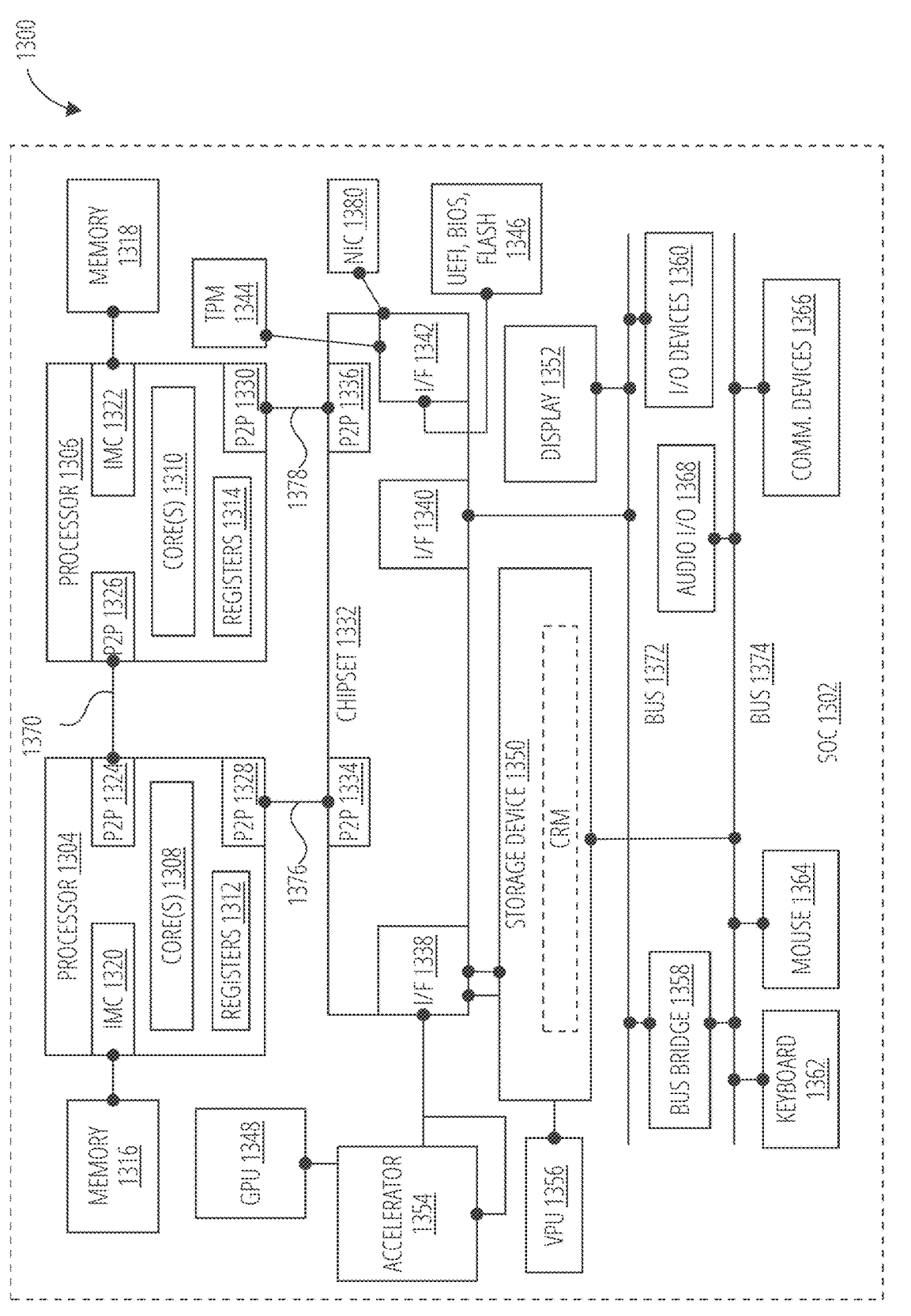
FIG. 13 illustrates a computing architecture 1300 in accordance with one embodiment.

As depicted in FIG. 4, the inferencing device 404 includes processing circuitry 418, a memory 420, a storage medium 422, an interface 424, a platform component 426, ML logic 428, and an ML model 430. In some implementations, the inferencing device 404 includes other components or devices as well. Examples for software elements and hardware elements of the inferencing device 404 are described in more detail with reference to a computing architecture 1300 as depicted in FIG. 13. Embodiments are not limited to these examples.

Figure 14:
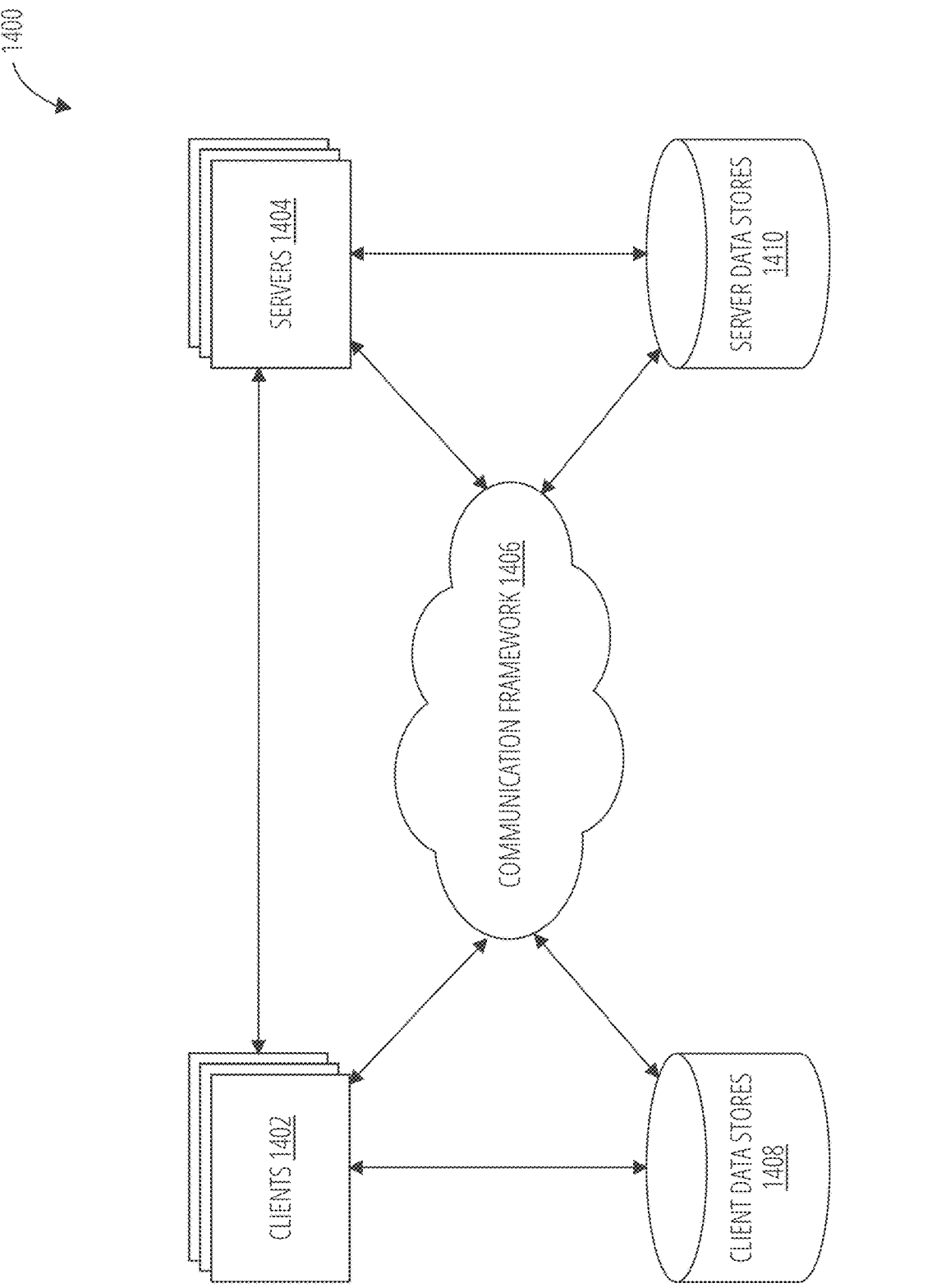
FIG. 14 illustrates a communications architecture 1400 in accordance with one embodiment.

The inferencing device 404 is generally arranged to receive an input 412, process the input 412 via one or more AI/ML techniques, and send an output 414. The inferencing device 404 receives the input 412 from the client device 402 via the network 408, the client device 406 via the network 410, the platform component 426 (e.g., a touchscreen as a text command or microphone as a voice command), the memory 420, the storage medium 422 or the data repository 416. The inferencing device 404 sends the output 414 to the client device 402 via the network 408, the client device 406 via the network 410, the platform component 426 (e.g., a touchscreen to present text, graphic or video information or speaker to reproduce audio information), the memory 420, the storage medium 422 or the data repository 416. Examples for the software elements and hardware elements of the network 408 and the network 410 are described in more detail with reference to a communications architecture 1400 as depicted in FIG. 14. Embodiments are not limited to these examples.

The inferencing device 404 includes ML logic 428 and an ML model 430 to implement various AI/ML techniques for various AI/ML tasks. The ML logic 428 receives the input 412, and processes the input 412 using the ML model 430. The ML model 430 performs inferencing operations to generate an inference for a specific task from the input 412. In some cases, the inference is part of the output 414. The output 414 is used by the client device 402, the inferencing device 404, or the client device 406 to perform subsequent actions in response to the output 414.

In various embodiments, the ML model 430 is a trained ML model 430 using a set of training operations. An example of training operations to train the ML model 430 is described with reference to FIG. 5.

For example, in some embodiments, a non-linear editing (NLE) application 432 executing on inferencing device 404 includes one or more ML models 430. In some embodiments, instances of the NLE application 432 execute on client device 402 and/or client device 406. The ML models 430 included in the NLE application 432 include one or more encoder neural networks such as the encoders 204a-204e and one or more decoder neural networks such as the decoders 206a-206b. The input 412 may include selection of a target video frame to be edited in the NLE application 432. The ML models 430 including the encoders 204a-204c may process a window of context frames including the target video frames to produce feature vectors for the window of context frames. The decoders 206a-206b may decode the feature vectors to create a mask such as masks 208a-208b or mask 308 as output 414.

More specifically, in some embodiments, the video frames (e.g., frames 102a-102c, 202a-202c, etc.) are stored in a compressed or uncompressed form, encoded with a media codec in a storage medium. The NLE application 432 may read the encoded representation of the frame from storage and store the encoded representation in memory. The NLE application 432 then decodes the encoded representation of the frame using one or more of a CPU, a GPU, or other hardware accelerator or onboard decoder. The NLE application 432 then renders and processes the frame using any onboard device or workflow to be prepared for use by the encoders 204a-204c and/or decoders 206a-206b. The ML model logic of the NLE application 432 (e.g., the encoders 204a and/or decoders 206a-206b) are executed on one or many inputs across one or many models (e.g., the encoders 204a and/or decoders 206a-206b). The model logic (e.g., the encoders 204a and/or decoders 206a-206b) may be executed on any device or hardware (or any combination thereof), including but not limited to a CPU, GPU, or other neural accelerator. The results of the model logic or any artifacts generated via the execution of the model logic are written to an in-memory cache. g) The results of the model logic are evaluated by the NLE application 432 and transformed into a mask for a given frame that is then presented to the user to interact with and use for the edit.

Figure 5:
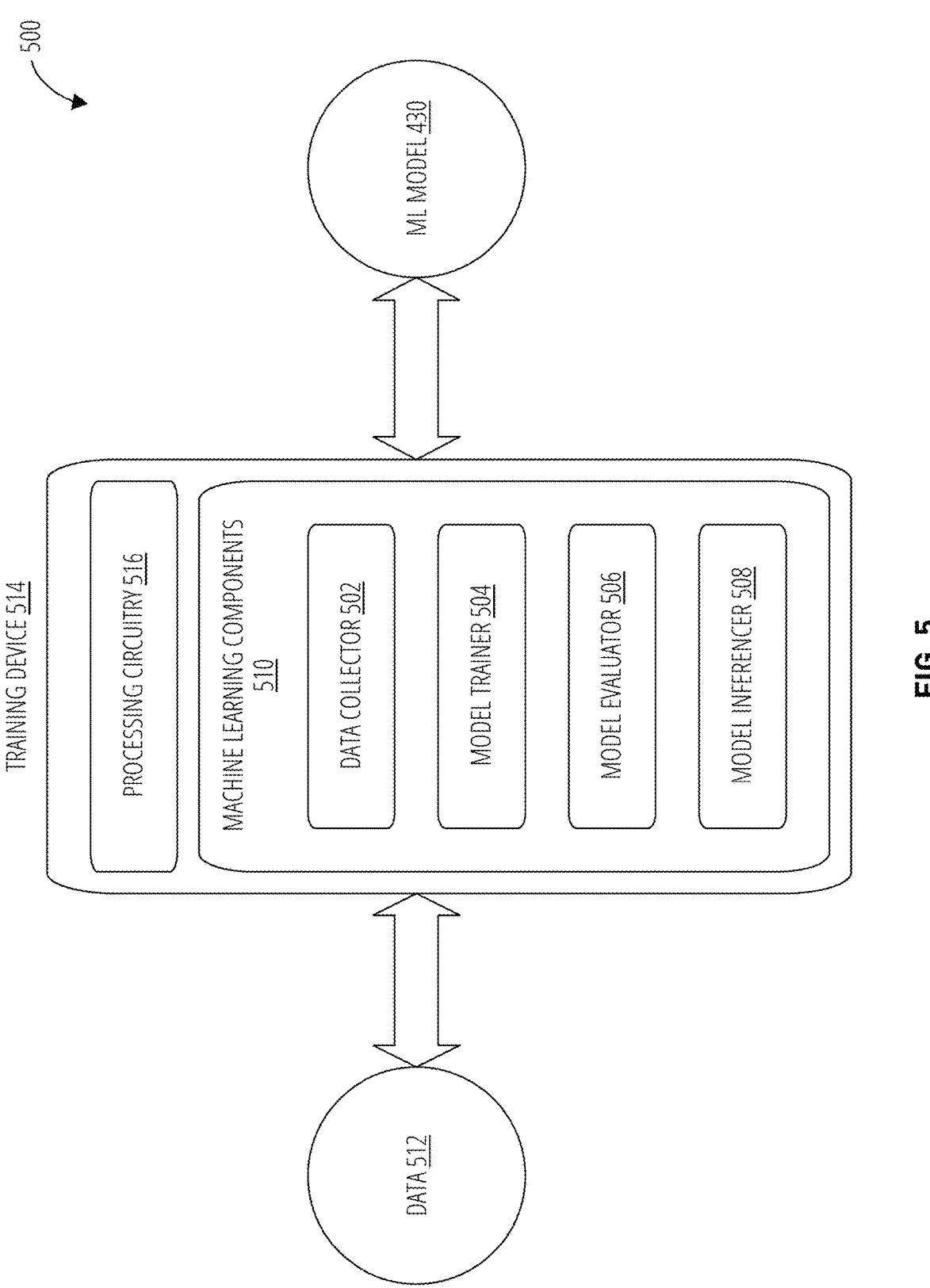
FIG. 5 illustrates an apparatus 500 in accordance with one embodiment.

FIG. 5 illustrates an apparatus 500. The apparatus 500 depicts a training device 514 suitable to generate a trained ML model 430 for the inferencing device 404 of the system 400. As stated, the ML model 430 includes one or more encoder neural networks such as encoders 204a-204c and one or more decoder neural networks such as decoders 206a-206b. As depicted in FIG. 5, the training device 514 includes a processing circuitry 516 and a set of ML components 510 to support various AI/ML techniques, such as a data collector 502, a model trainer 504, a model evaluator 506 and a model inferencer 508.

In general, the data collector 502 collects data 512 from one or more data sources to use as training data for the ML model 430. The data collector 502 collects different types of data 512, such as text information, audio information, image information, video information, graphic information, and so forth. The model trainer 504 receives as input the collected data and uses a portion of the collected data as test data for an AI/ML algorithm to train the ML model 430. The model evaluator 506 evaluates and improves the trained ML model 430 using a portion of the collected data as test data to test the ML model 430. The model evaluator 506 also uses feedback information from the deployed ML model 430. The model inferencer 508 implements the trained ML model

430 to receive as input new unseen data, generate one or more inferences on the new data, and output a result such as an alert, a recommendation or other post-solution activity.

For example, in some embodiments, the data 512 includes a plurality of videos, each video including a plurality of video frames. In such embodiments, each frame is labeled with one or more masks, e.g., to indicate one or more objects depicted in the respective frame. For example, the mask for a first frame indicates which pixels in the first frame depict a person, while the mask for a second frame indicates which pixels in the second frame depicts a cat, and so on. Similarly, in such embodiments, the labeled data 512 includes feature vectors for each training video frame. The video frames may be used as training data to train the one or more encoder neural networks such as encoders 204a-204e and one or more decoder neural networks such as decoders 206a-206b. For example, the encoders 204a-204e process one or more training frames in the data 512 to generate feature vectors for the frames. The model evaluator 506 then evaluates and improves the encoders 204a-204e based on the labels, e.g., using backpropagation or any other suitable technique. For example, if the encoders 204a-204c generate an output including a first set of features, the encoders 204a-204e are updated based on the accuracy the first set of features relative to the features in the labeled training data.

Similarly, the decoders 206a-206b are trained on the feature vectors in the data 512 and/or the output of the encoders 204a-204c (e.g., the feature vectors generated by the encoders 204a-204c during training). In some embodiments, the decoders 206a-206b process feature vectors for a context window of frames and generating a mask for a target video frame included in the context window of frames. The output of the decoders 206a-206b (e.g., one or more masks) is used by the model evaluator 506 to evaluate and improve the decoders 206a-206b based on the labels, e.g., using backpropagation. For example, if the decoders 206a-206b generate an output indicating a video frame depicts a person, and the label for the video frame indicates the video frame depicts a person, the decoders 206a-206b are updated based on the accurate prediction. Similarly, if the decoders 206a-206b generate an output indicating a video frame depicts a person, and the label for the video frame indicates the video frame depicts a bus, the decoders 206a-206b are updated based on the inaccurate prediction.

An exemplary AI/ML architecture for the ML components 510 is described in more detail with reference to FIG. 6.

Figure 6:
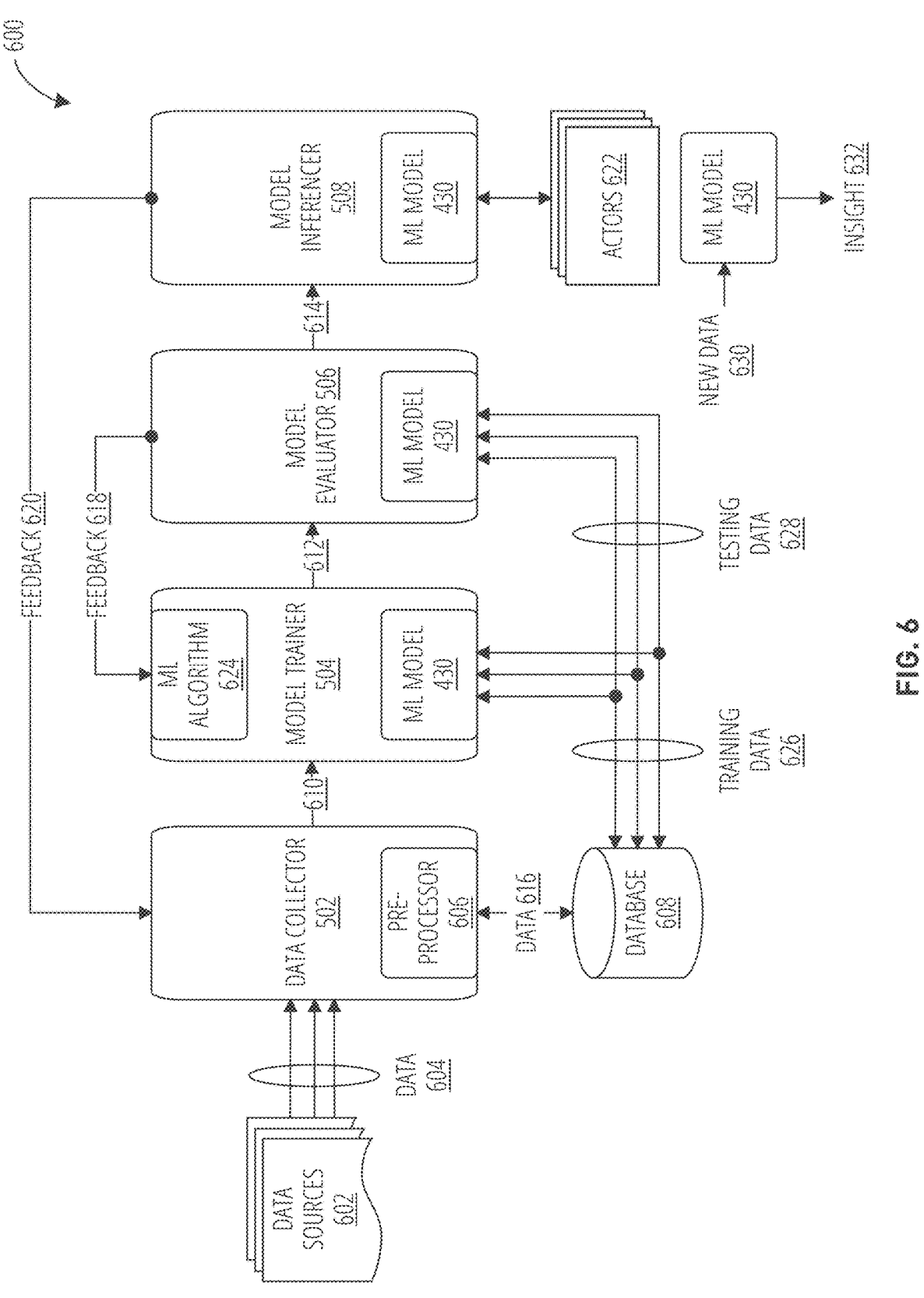
FIG. 6 illustrates an artificial intelligence architecture 600 in accordance with one embodiment.

FIG. 6 illustrates an artificial intelligence architecture 600 suitable for use by the training device 514 to generate the ML model 430 for deployment by the inferencing device 404. The artificial intelligence architecture 600 is an example of a system suitable for implementing various AI techniques and/or ML techniques to perform various inferencing tasks on behalf of the various devices of the system 400.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 600 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 430, evaluate performance of the trained ML model 430, and deploy the tested ML model 430 as the trained ML model 430 in a production environment, and continuously monitor and maintain it. As stated, the ML model 430 includes one or more encoder neural networks such as encoders 204a-204c and one or more decoder neural networks such as decoders 206a-206b.

The ML model 430 is a mathematical construct used to predict outcomes based on a set of input data. The ML model 430 is trained using large volumes of training data 626, and it can recognize patterns and trends in the training data 626 to make accurate predictions. The ML model 430 is derived from an ML algorithm 624 (e.g., a neural network, decision tree, support vector machine, etc.). A data set is fed into the ML algorithm 624 which trains an ML model 430 to "learn" a function that produces mappings between a set of inputs and a set of outputs with a reasonably high accuracy. Given a sufficiently large enough set of inputs and outputs, the ML algorithm 624 finds the function for a given task. This function may even be able to produce the correct output for input that it has not seen during training. A data scientist prepares the mappings, selects and tunes the ML algorithm 624, and evaluates the resulting model performance. Once the ML model 430 is sufficiently accurate on test data, it can be deployed for production use.

The ML algorithm 624 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 624 of the artificial intelligence architecture 600 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 6, the artificial intelligence architecture 600 includes a set of data sources 602 to source data 604 for the artificial intelligence architecture 600. Data sources 602 may comprise any device capable generating, processing, storing or managing data 604 suitable for a ML system. Examples of data sources 602 include without limitation databases, web scraping, sensors and Internet of Things (IoT) devices, image and video cameras, audio devices, text generators, publicly available databases, private databases, and many other data sources 602. The data sources 602 may be remote from the artificial intelligence architecture 600 and accessed via a network, local to the artificial intelligence architecture 600 an accessed via a network interface, or may be a combination of local and remote data sources 602.

The data sources 602 source different types of data 604. By way of example and not limitation, the data 604 includes structured data from relational databases, such as customer profiles, transaction histories, or product inventories. The data 604 includes unstructured data from websites such as customer reviews, news articles, social media posts, or product specifications. The data 604 includes data from temperature sensors, motion detectors, and smart home appliances. The data 604 includes image data from medical images, security footage, or satellite images. The data 604 includes audio data from speech recognition, music recognition, or call centers. The data 604 includes text data from emails, chat logs, customer feedback, news articles or social media posts. The data 604 includes publicly available datasets such as those from government agencies, academic institutions, or research organizations. The data 604 includes videos including a plurality of video frames such as video frames 102a-102c, frames 202a-202c, or 302a-302e. These are just a few examples of the many sources of data that can be used for ML systems. It is important to note that the quality and quantity of the data is critical for the success of a machine learning project.

The data 604 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 602 are communicatively coupled to a data collector 502. The data collector 502 gathers relevant data 604 from the data sources 602. Once collected, the data collector 502 may use a pre-processor 606 to make the data 604 suitable for analysis. This involves data cleaning, transformation, and feature engineering. Data preprocessing is a critical step in ML as it directly impacts the accuracy and effectiveness of the ML model 430. For example, the pre-processor 606 converts video frames to a predetermined resolution. As another example, the pre-processor 606 converts a colorspace of video frames according to a predetermined colorspace. The pre-processor 606 receives the data 604 as input, processes the data 604, and outputs pre-processed data 616 for storage in a database 608. Examples for the database 608 includes a hard drive, solid state storage, and/or random access memory (RAM).

The data collector 502 is communicatively coupled to a model trainer 504. The model trainer 504 performs AI/ML model training, validation, and testing which may generate model performance metrics as part of the model testing procedure. The model trainer 504 receives the pre-processed data 616 as input 610 or via the database 608. The model trainer 504 implements a suitable ML algorithm 624 to train an ML model 430 on a set of training data 626 from the pre-processed data 616. The training process involves feeding the pre-processed data 616 into the ML algorithm 624 to produce or optimize an ML model 430.

For example, when training the encoders 204a-204c, the training includes the encoders 204a-204e processing one or more video frames and generating feature vectors for each video frame. Furthermore, in some embodiments, the training includes determining an optimal size of a context window, e.g., based on different context window sizes. The encoders 204a-204e are then trained on a dataset of images that have been manually segmented (e.g., have ground truth masks and embeddings). For each image in the dataset, the encoders 204a-204e generate embeddings that are compared to the ground truth embeddings. The weights of the encoders 204a-204ca re updated based on the difference between its predictions and the ground truth embeddings. These steps are repeated until the encoders 204a-204e converge.

Similarly, when training the decoders 206a-206b, the training includes the decoders 206a-206b processing one or more sets of feature vectors of a context window of frames and generating a predicted mask for a target video frame included in the context window of frames. The predictions are compared to the ground truth masks. The weights of the decoders 206a-206b are updated based on the difference between its predictions and the ground truth masks. These steps are repeated until the decoders 206a-206b converge.

The model trainer 504 is communicatively coupled to a model evaluator 506. After an ML model 430 is trained, the ML model 430 needs to be evaluated to assess its performance. This is done using various metrics such as accuracy, precision, recall, and F1 score. The model trainer 504 outputs the ML model 430, which is received as input 610 or from the database 608. The model evaluator 506 receives the ML model 430 as input 612, and it initiates an evaluation process to measure performance of the ML model 430. The evaluation process includes providing feedback 618 to the model trainer 504. The model trainer 504 re-trains the ML model 430 to improve performance in an iterative manner.

The model evaluator 506 is communicatively coupled to a model inferencer 508. The model inferencer 508 provides AI/ML model inference output (e.g., inferences, predictions or decisions). Once the ML model 430 is trained and evaluated, it is deployed in a production environment where it is used to make predictions on new data. The model inferencer 508 receives the evaluated ML model 430 as input 614. The model inferencer 508 uses the evaluated ML model 430 to produce insights or predictions on real data, which is deployed as a final production ML model 430. The inference output of the ML model 430 is use case specific. The model inferencer 508 also performs model monitoring and maintenance, which involves continuously monitoring performance of the ML model 430 in the production environment and making any necessary updates or modifications to maintain its accuracy and effectiveness. The model inferencer 508 provides feedback 618 to the data collector 502 to train or re-train the ML model 430. The feedback 618 includes model performance feedback information, which is used for monitoring and improving performance of the ML model 430.

Some or all of the model inferencer 508 is implemented by various actors 622 in the artificial intelligence architecture 600, including the ML model 430 of the inferencing device 404, for example. The actors 622 use the deployed ML model 430 on new data to make inferences or predictions for a given task, and output an insight 632. The actors 622 implement the model inferencer 508 locally, or remotely receives outputs from the model inferencer 508 in a distributed computing manner. The actors 622 trigger actions directed to other entities or to itself. The actors 622 provide feedback 620 to the data collector 502 via the model inferencer 508. The feedback 620 comprise data needed to derive training data, inference data or to monitor the performance of the ML model 430 and its impact to the network through updating of key performance indicators (KPIs) and performance counters.

As previously described, the systems 400, 500 implement some or all of the artificial intelligence architecture 600 to support various use cases and solutions for various AI/ML tasks. In various embodiments, the training device 514 of the apparatus 500 uses the artificial intelligence architecture 600 to generate and train the ML model 430 for use by the inferencing device 404 for the system 400. In one embodiment, for example, the training device 514 may train the ML model 430 as a neural network, as described in more detail with reference to FIG. 7. Other use cases and solutions for AI/ML are possible as well, and embodiments are not limited in this context.

Figure 7:
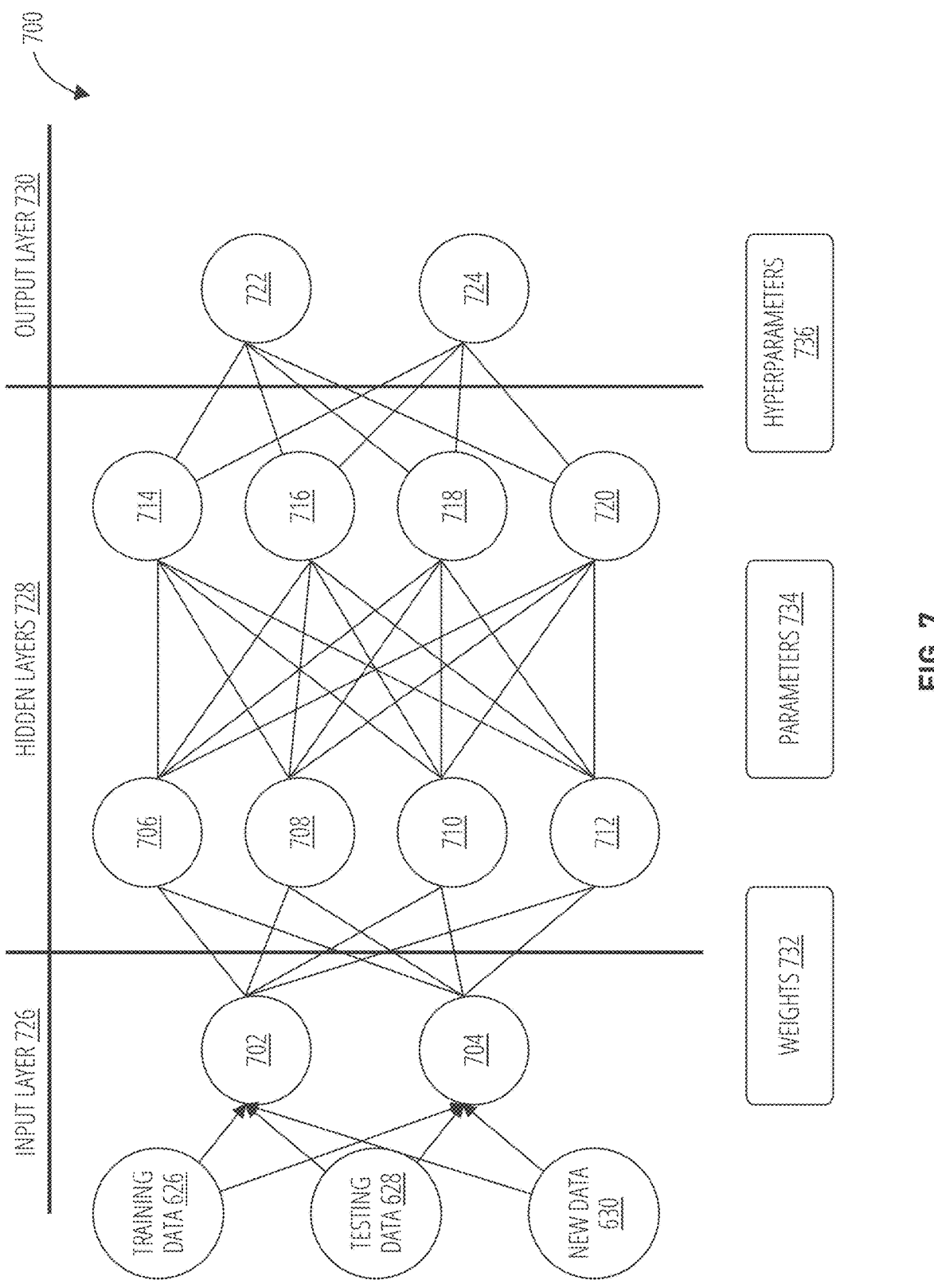
FIG. 7 illustrates an artificial neural network 700 in accordance with one embodiment.

FIG. 7 illustrates an embodiment of an artificial neural network 700. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another. The artificial neural network 700 is representative of the encoders 204a-204e and decoders 206a-206b.

Artificial neural network 700 comprises multiple node layers, containing an input layer 726, one or more hidden layers 728, and an output layer 730. Each layer comprises one or more nodes, such as nodes 702 to 724. As depicted in FIG. 7, for example, the input layer 726 has nodes 702, 704. The artificial neural network 700 has two hidden layers 728, with a first hidden layer having nodes 706, 708, 710 and 712, and a second hidden layer having nodes 714, 716, 718 and 720. The artificial neural network 700 has an output layer 730 with nodes 722, 724. Each node 702 to 724 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

For example, one or more layers of the encoders 204a-204e apply one or more filters to generate one or more features based on one or more pixels of a given image, such as frames 202a-202e. For example, one layer of the encoders 204a-204e extracts features such as horizontal or diagonal edges in an image. This output is passed to the next layer of the encoders 204a-204e which detect more complex features such as corners or combinational edges. Additional layers of the encoders 204a-204e identify more complex features such as objects, faces, etc.

One or more layers of the decoders 206a-206b use their trained weights to create a probability map for each pixel in the frames 202a-202e by reconstructing a representation of the image based on the feature vectors generated by the encoders 204a-204e. Each pixel in the probability map represents the probability that the pixel belongs to a particular object class. The decoders 206a-206b then use a threshold produce a mask that indicates which pixels belong to each object class.

In general, artificial neural network 700 relies on training data 626 to learn and improve accuracy over time. However, once the artificial neural network 700 is fine-tuned for accuracy, and tested on testing data 628, the artificial neural network 700 is ready to classify and cluster new data 630 at a high velocity. Tasks in speech recognition or image recognition can take minutes versus hours when compared to the manual identification by human experts.

Each individual node 702 to 724 is a linear regression model, composed of input data, weights, a bias (or threshold), and an output. The linear regression model may have a formula similar to Equation (1), as follows:

$$\sum wixi + \text{bias} = +w1x1 + w2x2 + w3x3 + \text{bias} \qquad \text{EQUATION (1)}$$

$$\text{output} = f(x) = 1 \text{ if } \sum w1x1 + b >= 0; 0 \text{ if } \sum w1x1 + b < 0$$

Once an input layer 726 is determined, a set of weights 732 are assigned. The weights 732 help determine the importance of any given variable, with larger ones contributing more significantly to the output compared to other inputs. The variables may include the features of feature vectors 304a-304e. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 700 as a feedforward network.

In one embodiment, the artificial neural network 700 leverages sigmoid neurons, which are distinguished by having values between 0 and 1. Since the artificial neural network 700 behaves similarly to a decision tree, cascading data from one node to another, having x values between 0 and 1 will reduce the impact of any given change of a single variable on the output of any given node, and subsequently, the output of the artificial neural network 700.

The artificial neural network 700 has many practical use cases, like image recognition, speech recognition, text recognition or classification. The artificial neural network 700 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 734 of the model adjust to gradually converge at the minimum.

In one embodiment, the artificial neural network 700 is feedforward, meaning it flows in one direction only, from input to output. In one embodiment, the artificial neural network 700 uses backpropagation. Backpropagation is when the artificial neural network 700 moves in the opposite direction from output to input. Backpropagation allows calculation and attribution of errors associated with each neuron 702 to 724, thereby allowing adjustment to fit the parameters 734 of the ML model 430 appropriately.

The artificial neural network 700 is implemented as different neural networks depending on a given task. Neural networks are classified into different types, which are used for different purposes. In one embodiment, the artificial neural network 700 is implemented as a feedforward neural network, or multi-layer perceptrons (MLPs), comprised of an input layer 726, hidden layers 728, and an output layer 730. While these neural networks are also commonly referred to as MLPs, they are actually comprised of sigmoid neurons, not perceptrons, as most real-world problems are nonlinear. Trained data 604 usually is fed into these models to train them, and they are the foundation for computer vision, natural language processing, and other neural networks. In one embodiment, the artificial neural network 700 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. The artificial neural network 700 is implemented as any type of neural network suitable for a given operational task of system 400, and the MLP and CNN are a few examples. Embodiments are not limited in this context.

The artificial neural network 700 includes a set of associated parameters 734. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 700 is implemented as a deep learning neural network. The term deep learning neural network refers to a depth of layers in a given neural network. A neural network that has more than three layers-which would be inclusive of the inputs and the output—can be considered a deep learning algorithm. A neural network that only has two or three layers, however, may be referred to as a basic neural network. A deep learning neural network may tune and optimize one or more hyperparameters 736. A hyperparameter is a parameter whose values are set before starting the model training process.

Deep learning models, including convolutional neural network (CNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 8 illustrates an operating environment 800 suitable for the system 400. The operating environment 800 comprises an example implementation for the inferencing device 404. As shown, the inferencing device 404 executes an instance of the NLE application 432, which includes one or more encoders such as encoder 204a and one or more decoders such as decoder 206a. As stated, the encoder 204a and decoder 206a are implemented as respective artificial neural networks 700. Although depicted as the inferencing device 404, the client devices 402, 406 include similar components and functionality.

Generally a user edits a video 804 using the NLE application 432. The video 804 may include a plurality of frames. The video 804 is stored by the inferencing device 404 or received by the inferencing device 404 from another device via a communications network. The NLE application 432 includes a user interface 802 which allows the user to select a frame of the video 804 for editing. When the user selects a frame of the video 804 via the user interface 802, the NLE application 432 generates a context window of N frames proximate to the selected frame of the video 804. The context window includes at least one frame preceding the selected frame and at least one frame subsequent to the selected frame.

The encoder 204a then processes each frame in the context window to generate a feature vector such as feature vectors 304a-304e for each frame. In some embodiments, the encoder 204a processes the frames in parallel (e.g., via a batch processing feature of a GPU such as GPU 1348 of FIG. 13 and/or via multiple core(s) 1308, 1310 of processors 1304, 1306 of FIG. 13). The decoder 206a then processes the feature vectors generated by the encoder 204a to produce a mask such as mask 208a. Embodiments are not limited in this context.

FIG. 9 illustrates an embodiment of a logic flow 900. The logic flow 900 is representative of some or all of the operations executed by one or more embodiments described herein. For example, the logic flow 900 includes some or all of the operations performed by devices or entities within the system 400 or the apparatus 500. In one embodiment, the logic flow 900 is implemented as instructions stored on a non-transitory computer-readable storage medium, such as the storage medium 422, that when executed by the processing circuitry 418 causes the processing circuitry 418 to perform the described operations. The storage medium 422 and processing circuitry 418 may be co-located, or the instructions may be stored remotely from the processing circuitry 418. Collectively, the storage medium 422 and processing circuitry 418 may form a system.

In block 902, logic flow 900 receives, by a NLE application such as NLE application 432 executing on a processing device implementing the present disclosure, selection of a target video frame, the target video frame one of a plurality of video frames of a video. In block 904, logic flow 900 determine, by the NLE application, a first set of video frames of a video based on a target video frame, wherein the first set includes the target video frame, one or more frames of the video preceding the target video frame, and one or more frames of the video subsequent to the target video frame, wherein the first set of video frames comprises a sequence of video frames of the video. In block 906, logic flow 900 processes, by an encoder neural network of the NLE application, the video frames in the first to produce a respective feature vector for each video frame in the first. In block 908, logic flow 900 decodes, by a decoder neural network of the NLE application, the feature vectors to generate a mask for the target video frame.

FIG. 10 illustrates an embodiment of a logic flow 1000. The logic flow 1000 is representative of some or all of the operations executed by one or more embodiments described herein. For example, the logic flow 1000 includes some or all of the operations performed by devices or entities within the system 400 or the apparatus 500. In one embodiment, the logic flow 1000 is implemented as instructions stored on a non-transitory computer-readable storage medium, such as the storage medium 422, that when executed by the processing circuitry 418 causes the processing circuitry 418 to perform the described operations. The storage medium 422 and processing circuitry 418 may be co-located, or the instructions may be stored remotely from the processing circuitry 418. Collectively, the storage medium 422 and the processing circuitry 418 may form a system.

In block 1002, logic flow 1000 receives, by a processing device implementing the present disclosure, training data comprising a plurality of video frames. Each frame is labeled, e.g., to indicate one or more objects depicted in a given frame. For example, the label for a first frame indicates the first frame depicts a person, while the label for a second frame indicates the second frame depicts a cat. In block 1004, logic flow 1000 generates, by the processing device, a plurality of windows comprising different subsets of the frames. In block 1006, logic flow 1000 encodes, by an encoder neural network executing on the processing device, the plurality of windows to generate a feature vector for each frame in each window. In block 1008, logic flow 1000 decodes, by an decoder neural network executing on the processing device, the feature vectors for each window to generate a respective mask for a target frame in each window. In block 1010, logic flow 1000 compares, by the processing device, the masks generated by the decoder to labels associated with the training data. In block 1012, logic flow 1000 updates the encoder neural network and the decoder neural network based on the comparison.

FIG. 11 illustrates an embodiment of a logic flow 1100. The logic flow 1100 is representative of some or all of the operations executed by one or more embodiments described herein. For example, the logic flow 1100 includes some or all of the operations performed by devices or entities within the system 400 or the apparatus 500. In one embodiment, the logic flow 1100 is implemented as instructions stored on a non-transitory computer-readable storage medium, such as the storage medium 422, that when executed by the processing circuitry 418 causes the processing circuitry 418 to perform the described operations. The storage medium 422 and processing circuitry 418 may be co-located, or the instructions may be stored remotely from the processing circuitry 418. Collectively, the storage medium 422 and the processing circuitry 418 may form a system.

According to some examples, the logic flow 1100 includes receiving selection of target video frame at block 1102. For example, an NLE application such as NLE application 432 receives user selection of a target video frame to be edited. The logic flow 1100 includes generating a context window at block 1104. For example, the NLE application 432 generates a context window including the target video frame, one or more of the plurality of video frames prior to the target video frame, and one or more of the plurality of video frames subsequent to the target video frame. The size of the context window may be predetermined, e.g., based on training of the encoders 204a-204e and/or decoders 206a-206b.

According to some examples, the logic flow 1100 includes encoding, by one or more encoder neural networks, the frames in the context window in parallel at block 1106. For example, the encoders 204a-204e may process the frames in the context window in parallel using circuitry of a GPU or one or more processor cores. According to some examples, the logic flow 1100 includes decoding, by one or more decoders 206a-206b, one or more feature vectors of another context window in parallel with the encoding of the frames of the context window to generate a mask for another target frame in the another context window at block 1108. For example, the decoders 206a-206b executing on one or more processor cores or a GPU may decode the feature vectors for another context window while the feature vectors are generated at block 1106.

According to some examples, the logic flow 1100 includes decoding, by the one or more neural networks, the feature vectors for the context window to generate a mask for the target frame at block 1110. For example, the decoders 206a-206b may decode the feature vectors for the context window generated at block 1106 to generate a mask for the target frame.

According to some examples, the logic flow 1100 includes storing feature vectors and/or masks at block 1112. The logic flow 1100 returns to block 1102 if the user specifies to edit another video frame. Otherwise, the logic flow 1100 ends.

Figure 12:
FIG. 12 illustrates a computer-readable storage medium 1202 in accordance with one embodiment.

FIG. 12 illustrates an apparatus 1200. Apparatus 1200 comprises a non-transitory computer-readable storage medium 1202 or machine-readable storage medium, such as an optical, magnetic, or semiconductor storage medium. In various embodiments, apparatus 1200 comprises an article of manufacture or a product. In some embodiments, the computer-readable storage medium 1202 stores computer executable instructions with which one or more processing devices or processing circuitry can execute. For example, computer executable instructions 1204 includes instructions to implement operations described with respect to any logic flows described herein. As another example, computer executable instructions for NLE application 1206 may include instructions to implement the NLE application 432. As another example, computer executable instructions for encoder 1208 include instructions to implement an encoder neural network such as encoders 204a-204c. As another example, computer executable instructions for decoder 1210 include instructions to implement a decoder neural network such as decoders 206a-206b.

Examples of computer-readable storage medium 1202 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1204 include any suitable type of code, such as source code, compiled code, interpreted code, executable code, static code, dynamic code, object-oriented code, visual code, and the like.

FIG. 13 illustrates an embodiment of a computing architecture 1300. Computing architecture 1300 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1300 has a single processor with one core or more than one processor. Note that the term "processor" refers to a processor with a single core or a processor package with multiple processor cores. In at least one embodiment, the computing architecture 1300 is representative of the components of the system 400. More generally, the computing architecture 1300 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1300. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 13, computing architecture 1300 comprises a system-on-chip (SoC) 1302 for mounting platform components. System-on-chip (SoC) 1302 is a point-to-point (P2P) interconnect platform that includes a first processor 1304 and a second processor 1306 coupled via a point-to-point interconnect 1370 such as an Ultra Path Interconnect (UPI). In other embodiments, the computing architecture 1300 is another bus architecture, such as a multi-drop bus. Furthermore, each of processor 1304 and processor 1306 are processor packages with multiple processor cores including core(s) 1308 and core(s) 1310, respectively. While the computing architecture 1300 is an example of a two-socket (2S) platform, other embodiments include more than two sockets or one socket. For example, some embodiments include a four-socket (4S) platform or an eight-socket (8S)

platform. Each socket is a mount for a processor and may have a socket identifier. Note that the term platform refers to a motherboard with certain components mounted such as the processor 1304 and chipset 1332. Some platforms include additional components and some platforms include sockets to mount the processors and/or the chipset. Furthermore, some platforms do not have sockets (e.g. SoC, or the like). Although depicted as a SoC 1302, one or more of the components of the SoC 1302 are included in a single die package, a multi-chip module (MCM), a multi-die package, a chiplet, a bridge, and/or an interposer. Therefore, embodiments are not limited to a SoC.

The processor 1304 and processor 1306 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1304 and/or processor 1306. Additionally, the processor 1304 need not be identical to processor 1306.

Processor 1304 includes an integrated memory controller (IMC) 1320 and point-to-point (P2P) interface 1324 and P2P interface 1328. Similarly, the processor 1306 includes an IMC 1322 as well as P2P interface 1326 and P2P interface 1330. IMC 1320 and IMC 1322 couple the processor 1304 and processor 1306, respectively, to respective memories (e.g., memory 1316 and memory 1318). Memory 1316 and memory 1318 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1316 and the memory 1318 locally attach to the respective processors (i.e., processor 1304 and processor 1306). In other embodiments, the main memory couples with the processors via a bus and shared memory hub. Processor 1304 includes registers 1312 and processor 1306 includes registers 1314.

Computing architecture 1300 includes chipset 1332 coupled to processor 1304 and processor 1306. Furthermore, chipset 1332 are coupled to storage device 1350, for example, via an interface (I/F) 1338. The I/F 1338 may be, for example, a Peripheral Component Interconnect-enhanced (PCIe) interface, a Compute Express Link® (CXL) interface, or a Universal Chiplet Interconnect Express (UCIe) interface. Storage device 1350 stores instructions executable by circuitry of computing architecture 1300 (e.g., processor 1304, processor 1306, GPU 1348, accelerator 1354, vision processing unit 1356, or the like). For example, storage device 1350 can store instructions for the client device 402, the client device 406, the inferencing device 404, the training device 514, or the like.

Processor 1304 couples to the chipset 1332 via P2P interface 1328 and P2P 1334 while processor 1306 couples to the chipset 1332 via P2P interface 1330 and P2P 1336. Direct media interface (DMI) 1376 and DMI 1378 couple the P2P interface 1328 and the P2P 1334 and the P2P interface 1330 and P2P 1336, respectively. DMI 1376 and DMI 1378 is a high-speed interconnect that facilitates, e.g., eight Giga Transfers per second (GT/s) such as DMI 3.0. In other embodiments, the processor 1304 and processor 1306 interconnect via a bus.

The chipset 1332 comprises a controller hub such as a platform controller hub (PCH). The chipset 1332 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1332 comprises more than one controller hub such as a chipset with a memory controller hub, a graphics controller hub, and an input/output (I/O) controller hub.

In the depicted example, chipset 1332 couples with a trusted platform module (TPM) 1344 and UEFI, BIOS, FLASH circuitry 1346 via I/F 1342. The TPM 1344 is a dedicated microcontroller designed to secure hardware by integrating cryptographic keys into devices. The UEFI, BIOS, FLASH circuitry 1346 may provide pre-boot code. The I/F 1342 may also be coupled to a network interface circuit (NIC) 1380 for connections off-chip.

Furthermore, chipset 1332 includes the I/F 1338 to couple chipset 1332 with a high-performance graphics engine, such as, graphics processing circuitry or a graphics processing unit (GPU) 1348. In other embodiments, the computing architecture 1300 includes a flexible display interface (FDI) (not shown) between the processor 1304 and/or the processor 1306 and the chipset 1332. The FDI interconnects a graphics processor core in one or more of processor 1304 and/or processor 1306 with the chipset 1332.

The computing architecture 1300 is operable to communicate with wired and wireless devices or entities via the network interface (NIC) 1380 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, GPU 1348, accelerator 1354, and/or vision processing unit 1356 are coupled to chipset 1332 via I/F 1338. The GPU 1348 is a specialized electronic circuit that accelerates the creation and rendering of images, video, and 3D graphics. The GPU 1348 is composed of a number of processors, where each processor includes one or more processor cores. The GPU 1348 includes one or more processors responsible for performing the actual graphics processing, and one or more processors responsible for executing the individual instructions that make up the graphics pipeline. The graphics pipeline is a series of steps that are performed to render an image. The first step is to generate a scene description, which is a mathematical representation of the objects in the scene. The scene description is then passed to the GPU 1348, which uses it to generate a series of triangles. The triangles are then rasterized, which is the process of converting them into pixels. The pixels are then rendered, which is the process of assigning colors to them. Because the GPU 1348 includes multiple processors with multiple cores, the GPU 1348 is suited for parallel processing tasks. For example, the GPU 1348 may execute encoders 204a-204e to encode video frames into feature vectors in parallel and execute decoders 206a-206b to decode the feature vectors in parallel. In some embodiments, the encoding and decoding occur in parallel.

The accelerator 1354 is representative of any type of accelerator device (e.g., a data streaming accelerator, cryptographic accelerator, cryptographic co-processor, an offload engine, the GPU 1348, etc.). The accelerator 1354 is a device including circuitry to accelerate copy operations, data encryption, hash value computation, data comparison operations, and/or data compression. Examples for the accelerator 1354 include a USB device, PCI device, PCIe device, CXL device, UCIe device, and/or an SPI device.

The GPU 1348 and/or the accelerator 1354 include circuitry arranged to execute machine learning (ML) related operations (e.g., training, inference, etc.) for ML models. Generally, the GPU 1348 and/or the accelerator 1354 are specially designed to perform computationally intensive operations, such as mathematical operations, hash value computations, comparison operations, cryptographic operations, and/or compression operations, in a manner that is more efficient than when performed by the processor 1304 or processor 1306. Because the load of the computing architecture 1300 includes hash value computations, comparison operations, cryptographic operations, and/or compression operations, the GPU 1348 and/or the accelerator 1354 greatly increases performance of the computing architecture 1300 for these operations.

Various I/O devices 1360 and display 1352 couple to the bus 1372, along with a bus bridge 1358 which couples the bus 1372 to a second bus 1374 and an I/F 1340 that connects the bus 1372 with the chipset 1332. In one embodiment, the second bus 1374 is a low pin count (LPC) bus. Various input/output (I/O) devices couple to the second bus 1374 including, for example, a keyboard 1362, a mouse 1364 and communication devices 1366.

Furthermore, an audio I/O 1368 couples to second bus 1374. Many of the I/O devices 1360 and communication devices 1366 reside on the system-on-chip (SoC) 1302 while the keyboard 1362 and the mouse 1364 are add-on peripherals. In other embodiments, some or all the I/O devices 1360 and communication devices 1366 are add-on peripherals and do not reside on the system-on-chip (SoC) 1302.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 includes one or more clients 1402 and servers 1404. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 communicate information between each other using a communication framework 1406. The communication framework 1406 implements any well-known communications techniques and protocols. The communication framework 1406 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1406 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/400/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1402 and the servers 1404. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which stores an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

What is claimed is:

1. A method, comprising:

receiving, by a non-linear video editing application, selection of a target video frame of a video;

determining, by a processor, a first set of video frames of the video based on the target video frame, wherein the first set includes the target video frame, one or more frames of the video preceding the target video frame, and one or more frames of the video subsequent to the target video frame, wherein the first set of video frames comprises a sequence of video frames of the video;

encoding, by an encoder neural network executing on the processor, the first set of video frames of the video in parallel to generate a respective feature vector for each video frame in the first set;

decoding, by a decoder neural network executing on the processor, the feature vectors to generate a mask for the target video frame; and editing, by the non-linear video editing application, an object of the target video frame of the video using the mask.

2. The method of claim 1, wherein the encoder neural network is configured to determine a count of frames in the first set of video frames, wherein the encoder neural network is configured to determine the feature vectors based on determining a plurality of features of the feature vectors, wherein the decoder neural network approximates a hidden state for the target video frame based on the feature vectors.

3. The method of claim 1, further comprising:

receiving, by the processor, selection of another target video frame, wherein the another target video frame is subsequent to the target video frame;

determining, by the processor, a second set of video frames of the video based on the another target video frame, wherein the second set of video frames includes: (i) a subset of the first set of the video frames, (ii) the another target video frame, and (iii) another video frame, wherein the another video frame is subsequent to the first set of video frames, wherein the subset of the first set of video frame excludes at least one of the one or more frames of the video preceding the target video frame;

encoding, by the encoder neural network, the another video frame to generate a feature vector for the another video frame; and decoding, by the decoder neural network, the feature vectors of the second set of video frames to generate a mask for the another target video frame.

4. The method of claim 1, wherein encoding the first set of video frames comprises encoding the first set of video frames in parallel using at least one of: (i) a plurality of cores of a graphics processing unit (GPU), or (ii) a plurality of processor cores of the processor, wherein decoding the feature vectors comprises decoding the feature vectors in parallel using at least one of: (i) the plurality of cores of the GPU, or (ii) the plurality of cores of the processor.

5. The method of claim 4, wherein the encoder neural network is one of a plurality of instances of the encoder neural network, wherein the decoder neural network is one of a plurality of instances of the decoder neural network, wherein the plurality of instances of the encoder neural network and the plurality of instances of the decoder neural network execute on the cores of the GPU or the cores of the processor, wherein each instance of the encoder neural network encodes at least one video frame of the first set of video frames, wherein each instance of the decoder neural network decodes at least one feature vector for the first set of video frames.

6. The method of claim 1, wherein the feature vectors comprise a plurality of features, wherein the decoder neural network decodes a first subset of the plurality of features for a first subset of the first set of video frames, wherein the decoder neural network decodes a second subset of the plurality of features for a second subset of the first set of video frames, wherein the first and second subsets of the plurality of features are different.

7. The method of claim 1, wherein the mask comprises a segmentation mask, wherein the segmentation mask is associated with at least one object depicted in the target video frame.

8. The method of claim 1, wherein the encoder neural network and the decoder neural network are components of the non-linear video editing system, wherein the target video frame is selected for editing in the non-linear video editing system prior to the determination of the first set of video frames, wherein the encoder neural network and the decoder neural network are separate neural networks.

9. The method of claim 1, wherein the mask is generated without the encoder neural network processing a second set of video frames of the video and without the decoder neural network processing respective feature vectors for the second set of video frames.

10. A non-transitory computer-readable medium storing executable instructions, which when executed by one or more processing devices, cause the one or more processing devices to perform operations comprising:

receiving, by a non-linear video editing application, selection of a target video frame of a video;

determining, by the non-linear video editing application, a first set of video frames of the video based on the target video frame, wherein the first set includes the target video frame, one or more frames of the video preceding the target video frame, and one or more frames of the video subsequent to the target video frame, wherein the first set of video frames comprises a sequence of video frames of the video;

encoding, by an encoder neural network, the first set of video frames of the video in parallel to generate a respective feature vector for each video frame in the first set; and decoding, by a decoder neural network, the feature vectors to generate a mask for the target video frame; and editing, by the non-linear video editing application, an object of the target video frame of the video using the mask.

11. The non-transitory computer-readable medium of claim 10, wherein the encoder neural network is configured to determine a count of frames in the first set of video frames, wherein the encoder neural network is configured to determine the feature vectors based on determining a plurality of features of the feature vectors, wherein the decoder neural network approximates a hidden state for the target video frame based on the feature vectors.

12. The non-transitory computer-readable medium of claim 10, storing executable instructions, which when executed by the one or more processing devices, cause the one or more processing devices to perform operations comprising:

performing a processing operation on the target video frame based on the mask for the target video frame.

13. The non-transitory computer-readable medium of claim 12, wherein the processing operation comprises one or more of: (i) modifying a color of an object depicted in the target video frame, (ii) moving the object in the target video frame, (iii) removing the object from the target video frame, or (iv) modifying an attribute of the object.

14. The non-transitory computer-readable medium of claim 10, wherein the mask comprises a segmentation mask, wherein the segmentation mask is associated with at least one object depicted in the target video frame.

15. The non-transitory computer-readable medium of claim 10, wherein the feature vectors comprise a plurality of features, wherein the decoder neural network decodes a first subset of the plurality of features for a first subset of the first set of video frames, wherein the decoder neural network decodes a second subset of the plurality of features for a second subset of the first set of video frames, wherein the first and second subsets of the plurality of features are different.

16. A system, comprising:
a memory component; and
a processing device coupled to the memory component, the processing device to perform operations comprising:

receiving, by a non-linear video editing application, selection of a target video frame of a video;

determining, by the non-linear video editing application, a first set of video frames of the video based on a target video frame, wherein the first set includes the target video frame, one or more frames of the video preceding the target video frame, and one or more frames of the video subsequent to the target video frame, wherein the first set of video frames comprises a sequence of video frames of the video;

encoding, by an encoder neural network, the first set of video frames of the video in parallel to generate a respective feature vector for each video frame in the first set;

decoding, by a decoder neural network, the feature vectors to generate a mask for the target video frame; and editing, by the non-linear video editing application, an object of the target video frame of the video using the mask.

17. The system of claim 16, the processing device to perform operations comprising:

receiving selection of another target video frame, wherein the another target video frame is subsequent to the target video frame;

determining a second set of video frames of the video based on the another target video frame, wherein the second set of video frames includes: (i) a subset of the first set of the video frames, (ii) the another target video frame, and (iii) another video frame, wherein the another video frame is subsequent to the first set of video frames, wherein the subset of the first set of video frame excludes at least one of the one or more frames of the video preceding the target video frame;

encoding, by the encoder neural network, the another video frame to generate a feature vector for the another video frame; and decoding, by the decoder neural network, the feature vectors of the second set of video frames to generate a mask for the another target video frame.

18. The system of claim 16, wherein the encoder neural network is configured to determine a count of frames in the first set of video frames, wherein the encoder neural network is configured to determine the feature vectors based on determining a plurality of features of the feature vectors, wherein the decoder neural network approximates a hidden state for the target video frame based on the feature vectors.

19. The system of claim 16, wherein the feature vectors comprise a plurality of features, wherein the decoder neural network decodes a first subset of the plurality of features for a first subset of the first set of video frames, wherein the decoder neural network decodes a second subset of the plurality of features for a second subset of the first set of video frames, wherein the first and second subsets of the plurality of features are different.

20. The system of claim 16, wherein the mask comprises a segmentation mask, wherein the segmentation mask is associated with at least one object depicted in the target video frame.

* * * * *